(12) United States Patent
Hale

(10) Patent No.: US 10,598,394 B2
(45) Date of Patent: Mar. 24, 2020

(54) COOLING DEVICE

(71) Applicant: HALE INDUSTRIES, INC., Fortville, IN (US)

(72) Inventor: Michael Craig Hale, Fortville, IN (US)

(73) Assignee: Hale Industries, Inc., Fortville, IN (US)

( * ) Notice: Subject to any disclaimer, the term of this patent is extended or adjusted under 35 U.S.C. 154(b) by 0 days.

(21) Appl. No.: 15/362,466

(22) Filed: Nov. 28, 2016

(65) Prior Publication Data

US 2018/0149376 A1 May 31, 2018

(51) Int. Cl.
F24F 5/00 (2006.01)
F24F 13/20 (2006.01)

(52) U.S. Cl.
CPC ............ F24F 5/0035 (2013.01); F24F 13/20 (2013.01); F24F 2221/14 (2013.01)

(58) Field of Classification Search
CPC ....... F24F 2001/0085; F24F 2001/0088; F24F 3/1411; F24F 5/0035; F24F 13/20; F24F 2221/14; F25B 2339/041
See application file for complete search history.

(56) References Cited

U.S. PATENT DOCUMENTS

| | | | |
|---|---|---|---|
| 3,867,486 A | 2/1975 | Nagele | |
| 4,440,000 A | 4/1984 | Bacchus | |
| 4,476,066 A * | 10/1984 | Gollub | F24F 13/20 62/314 |
| 4,657,709 A | 4/1987 | Goettl | |
| 4,932,218 A | 6/1990 | Robbins | |
| 4,939,907 A | 7/1990 | Taylor | |
| 5,857,350 A * | 1/1999 | Johnson | F24F 5/0035 62/314 |
| 5,996,868 A | 12/1999 | Paradis | |
| 5,996,898 A | 12/1999 | Parker | |
| 6,367,277 B1 * | 4/2002 | Kinkel | F24F 5/0035 62/315 |
| 6,422,030 B1 * | 7/2002 | Calvert | F24F 5/0035 62/310 |
| 7,014,174 B2 * | 3/2006 | Roberts | F24F 5/0035 261/106 |
| 7,174,732 B2 * | 2/2007 | Taniguchi | B01D 5/0093 62/183 |
| 2004/0104286 A1 | 6/2004 | Harrison | |
| 2007/0163280 A1 | 7/2007 | Meerpohl | |
| 2008/0018001 A1 * | 1/2008 | Kammerzell | F24F 5/0035 261/97 |
| 2008/0251611 A1 * | 10/2008 | Delattre | F24F 5/0035 239/463 |

(Continued)

OTHER PUBLICATIONS

Hessaire: How much do the evaporative cooler lower the temperature. 2015. Accessed Mar. 2018.*

(Continued)

Primary Examiner — Jianying C Atkisson
Assistant Examiner — Tavia Sullens
(74) Attorney, Agent, or Firm — The Law Firm of A.Q. Basit

(57) ABSTRACT

A cooling device includes a cover, a trough connected to the cover, and a fan circulating air that is received from the sides of the cooling device. The area above the fan is enclosed by the cover. The cooling device also includes a pump for delivering liquid to one or more pads located in the trough.

11 Claims, 27 Drawing Sheets

(56) References Cited

U.S. PATENT DOCUMENTS

| | | | |
|---|---|---|---|
| 2009/0107161 A1 | 4/2009 | Jung | |
| 2013/0233005 A1* | 9/2013 | Gilbert | F24F 5/0035 62/121 |
| 2014/0250939 A1* | 9/2014 | Parker | F24F 5/0035 62/305 |

OTHER PUBLICATIONS

Nick Black, Ketan Kumar, Kenny Lampert, Matt Steggeman, Chris Tantillo, Presentation, ME 463, Purdue University, Dec. 14, 2015, 11 pages.

Nick Black, Ketan Kumar, Kenny Lampert, Matt Steggeman, Christ Tantillo, Paper, ME 463, Purdue University, Dec. 14, 2015, 56 pages.

Kim, Harry C., PCT Search Report, Application No. PCT/18/34492, dated Jul. 27, 2018, 15 pages, United States Patent and Trademark Office.

Young, Lee W., PCT Search Report, Application No. PCT/17/063206, dated Mar. 3, 2018, 13 pages, United States Patent and Trademark Office.

* cited by examiner

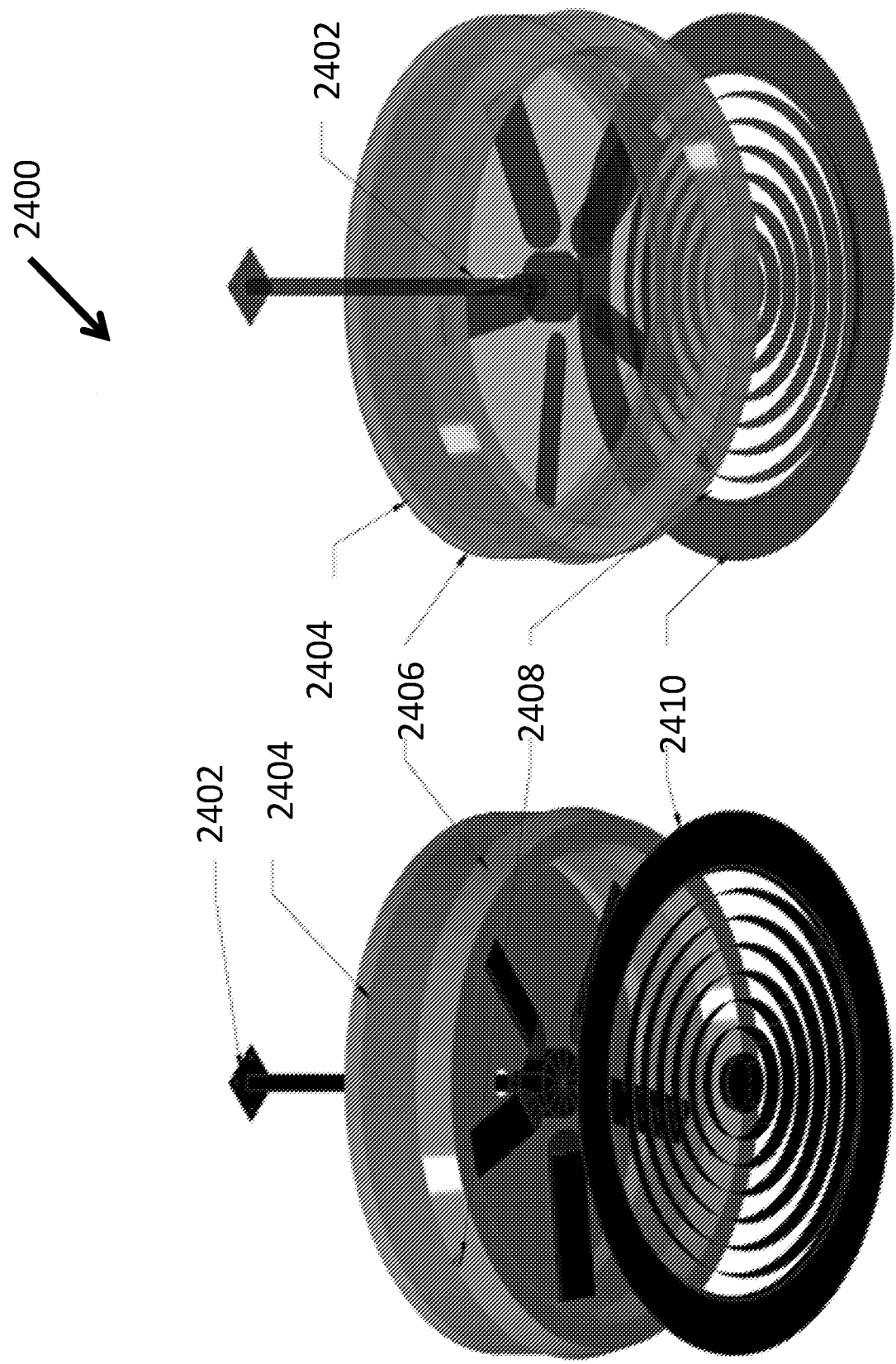

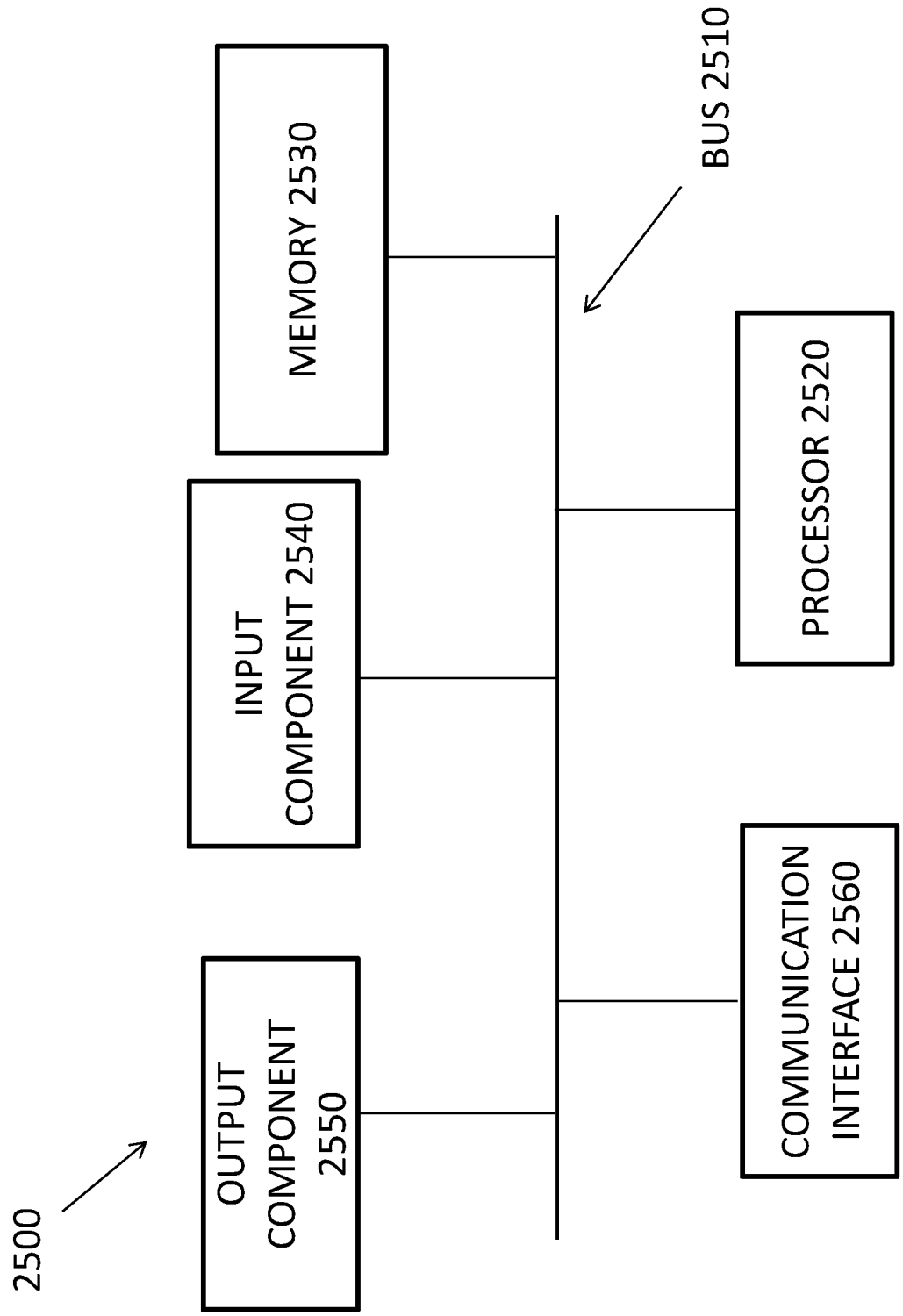

COOLING DEVICE

BACKGROUND

Building spaces, such as office spaces, restaurants, auditoriums, warehouse areas, and manufacturing shop floors may require cooling systems to provide comfortable temperature and humidity levels to individuals who are occupying those particular building spaces. However, these existing systems may not be able to provide sufficient cooling and may require multiple cooling systems or a combination of cooling systems to provide a comfortable environment.

Outdoor areas, such as patio areas for restaurants, may also use cooling systems such as fans and evaporative coolers. However, these existing systems may not be able to provide sufficient cooling and may require multiple cooling systems or a combination of cooling systems to provide a comfortable environment.

BRIEF DESCRIPTION OF DRAWINGS

FIGS. 24A and 24B are diagrams of an alternate embodiment of the cooling device; and FIG. 25 is a diagram of an example computing device.

DETAILED DESCRIPTION OF PREFERRED EMBODIMENTS

The following detailed description refers to the accompanying drawings. The same reference numbers in different drawings may identify the same or similar elements.

Systems, devices, and/or methods described herein may allow for a cooling device (e.g., a device or a collection of devices) to provide a reduction to air temperature within a particular area/space. In embodiments, the device may include a fan which operates with an evaporating cooling system to reduce air temperature. In embodiments, the installation of the cooling device may reduce the need for multiple cooling systems to condition the same amount of area. For example, a patio area of a restaurant may require a single cooling device, instead of multiple cooling devices, to reduce the air temperature level and allow restaurant customers to sit in an area with a cooler temperature level.

Figure 1A:
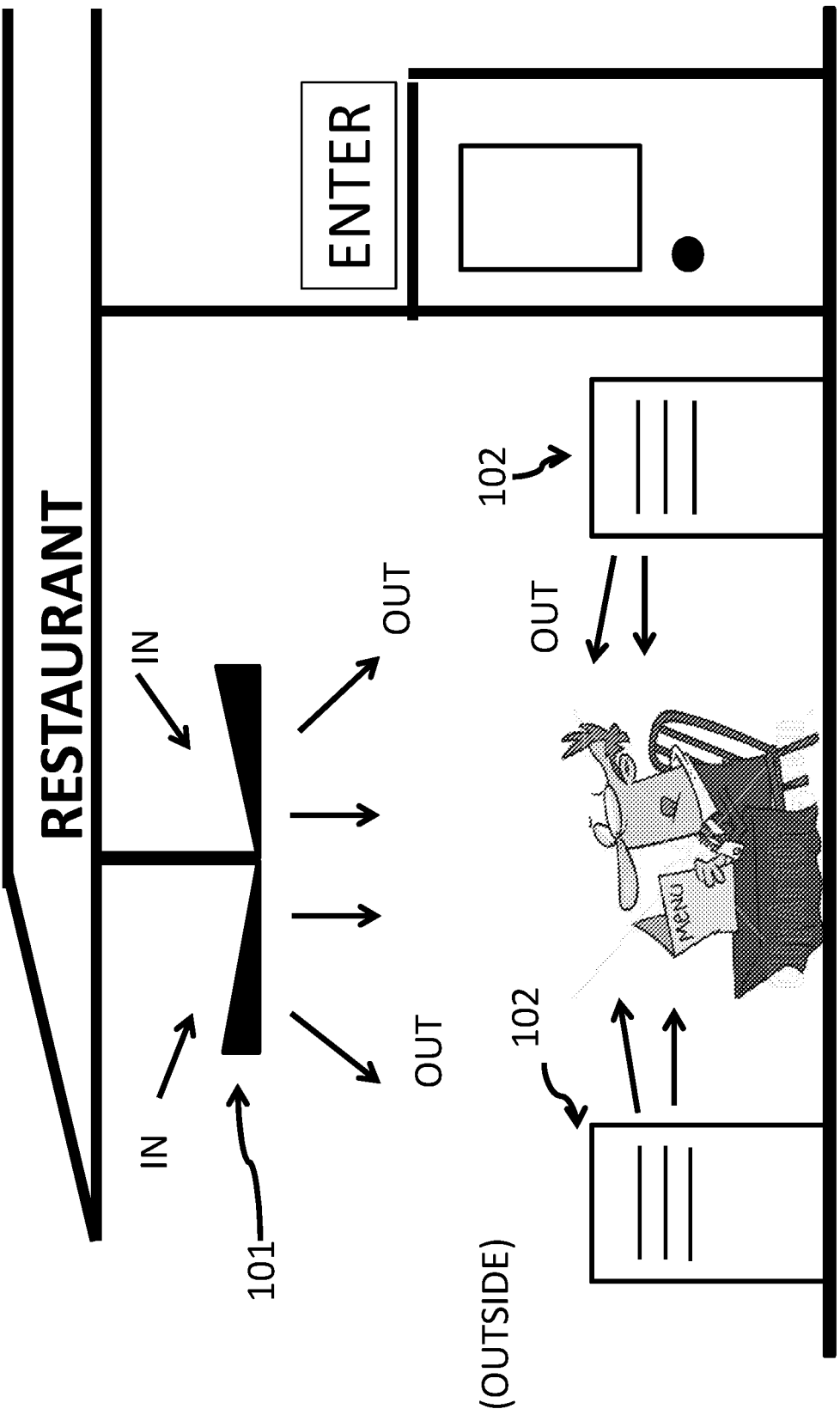
FIG. 1A is a diagram of an example environment.

FIG. 1A describes an example of an individual sitting in an outside (e.g., an exterior area outside a building) patio area. To provide the comfortable temperature levels desired by the restaurant customers, the restaurant may have to install an outdoor ceiling fan 101 which circulates air from above the fan. However, since the ceiling fan only moves air, the ceiling fan is limited in how much cooling it can provide to the restaurant customers sitting in the patio area. Thus, the restaurant owners may also have to install evaporative cooling systems 102 which can be placed on ground. Evaporative cooling systems 102 may be able to cool the air temperature in the patio area, but they generate an airstream that includes a mist (e.g., haze, fog like appearance, etc.) into the patio area. While the comfort level in the patio area may be improved, the additional systems take up additional space on the patio area floor. As such, the restaurant owners are spending additional money on the evaporative coolers and also losing money because there is less patio space for additional customers. Furthermore, as the additional evaporative coolers are mechanical devices, the evaporative coolers are not aesthetically pleasing to view and, thus, reduce the enjoyment experience of the restaurant customers.

Figure 1B:
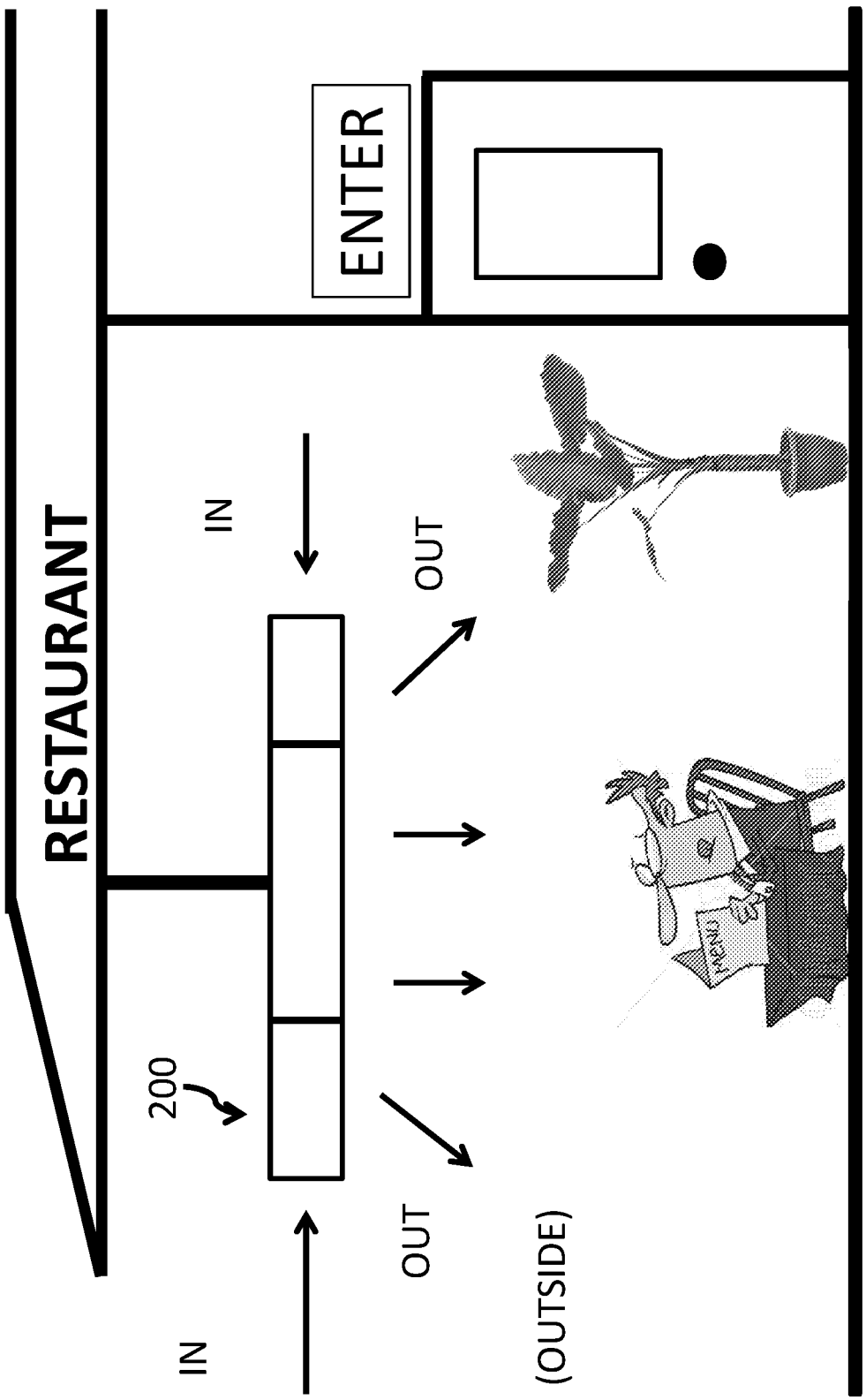
FIGS. 1B and 1C are diagrams of example environments in which systems and/or methods described herein may be implemented.
Figure 1C:
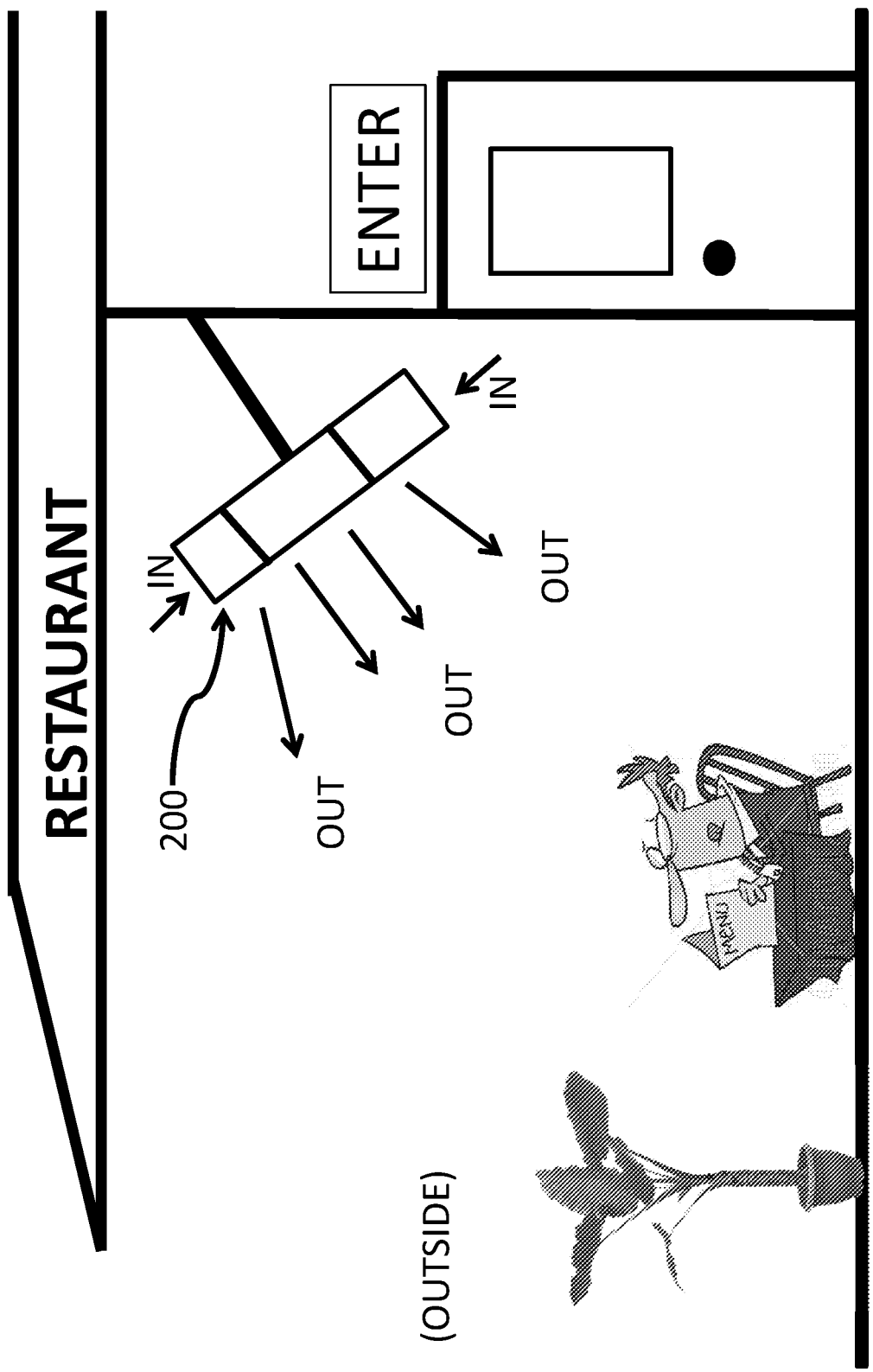

In contrast, the device and/or systems described herein overcome the deficiencies shown in FIG. 1A. As shown in FIG. 1B, cooling device 200 is attached to the ceiling of the patio area and provides cooling to the patio area. Since cooling device 200 incorporates evaporative cooling systems, it is unnecessary to install the multiple cooling systems described in FIG. 1A. As shown in FIG. 1B, air initially enters cooling device 200 from the sides of cooling device 200 and not from above cooling device 200. In contrast, in this example, ceiling fan 101 obtains air from above ceiling fan 101. Thus, as shown in FIG. 1B, there are no evaporative coolers taking up valuable patio flooring space. Instead, the restaurant owner, in this example, can now place decorative plants that improve the visual experience of the patio area. Furthermore, the air that is supplied by cooling device 200 does not include any visible mist, hazy, or fog-like appearance. FIG. 1C shows cooling device 200 as attached to a side wall instead of the ceiling. While not shown, instead of connecting directly to a ceiling or wall, cooling device 200 may connect from a structure that connects to a ceiling or wall. Furthermore, cooling device 200 may connect at an angle to a part of a building structure (e.g., ceiling, wall, etc.).

Thus, restaurant customers are able to enjoy the experience of eating in a temperature controlled patio area without the need to place multiple mechanical devices within the restaurant customer's surroundings. Furthermore, the restaurant owner, another type of business, or a residential user, does not have to: (i) purchase and use different types of cooling systems at the same time, (ii) maintain different types of cooling systems, and/or (iii) sacrifice valuable commercial or residential space for mechanical equipment. While the cooling device, or systems, have been described within the context of a restaurant, the cooling device (e.g. cooling device 200) may be used in other types of settings, such as in a residential home, interior spaces, other types of exterior spaces (e.g., picnic areas, outside work areas—farming activities, etc.), and/or any other space that may require a cooling device.

As a result, cooling device 200, provides desired temperature levels without having to install multiple different devices, such as fans, evaporative coolers, and/or other types of cooling devices for the same area to be cooled. Furthermore, cooling device 200 does not generate any supplied air with mist, haze, a fog-like appearance, etc. Because multiple different types of devices are not installed, there is a reduction in costs associated with purchasing and maintenance. Instead, one or more cooling devices 200 can be purchased and used to provide the desired temperature levels. Furthermore, the reduction in other types of devices may also increase the flooring area to install decorative products (e.g., plants, statues), tables, barbeque system, manufacturing machines, and/or other items.

Figure 2:
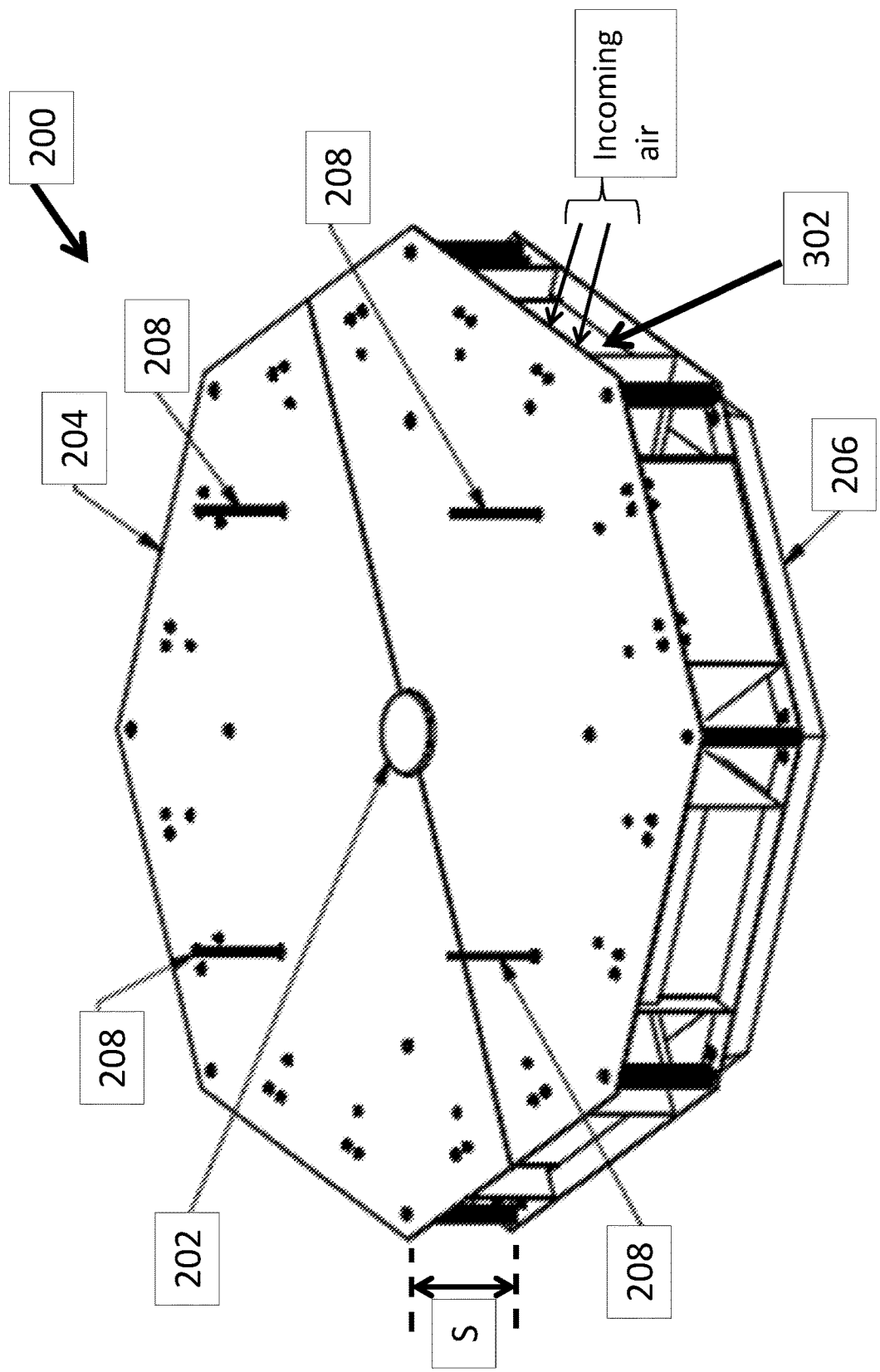
FIGS. 2 and 3 are diagrams of an example cooling device.

FIG. 2 is a diagram of example cooling device 200. FIG. 2 shows fan 202, cover 204, trough 206, connector 208, and pad 302 which is described in later figures.

Fan 202 may be a device that rotates in a circular or elliptical fashion. In embodiments, fan 202 may have one or more blades, which extend from a central hub of fan 202, that rotate when mechanical power is provided to fan 202 via the central hub which may include a motor (e.g., electrical, mechanical, etc.) to rotate the one or more blades. While blades are described, the blades may also be known as paddles or by any other name. In embodiments, fan 202 may force, i.e., push, air in a particular direction. For example, if cooling device 200 is mounted from a ceiling, fan 202 may push air downwards and across the area below the ceiling. Alternatively, for example, if cooling device 200 is mounted on a side wall (e.g., a vertical wall of a building), fan 2002 may push air across a particular area. In embodiments, fan 202 may push air (as shown as "incoming air" in FIG. 2) that has initially passed through pads, such as pads 302. In embodiments, fan 202 may be a variable speed driven fan or may be a constant speed driven fan. In embodiments, the blades of fan 202 may be manufactured from a metal material, a plastic material, or a hybrid material. In embodiments, fan 202 may have a motor size and blade dimensions that allow for minimizing noise, power requirements, vibration effects, and sizing of cover 204, trough 206, and pads 302 (as described in further drawings).

Figure 3:
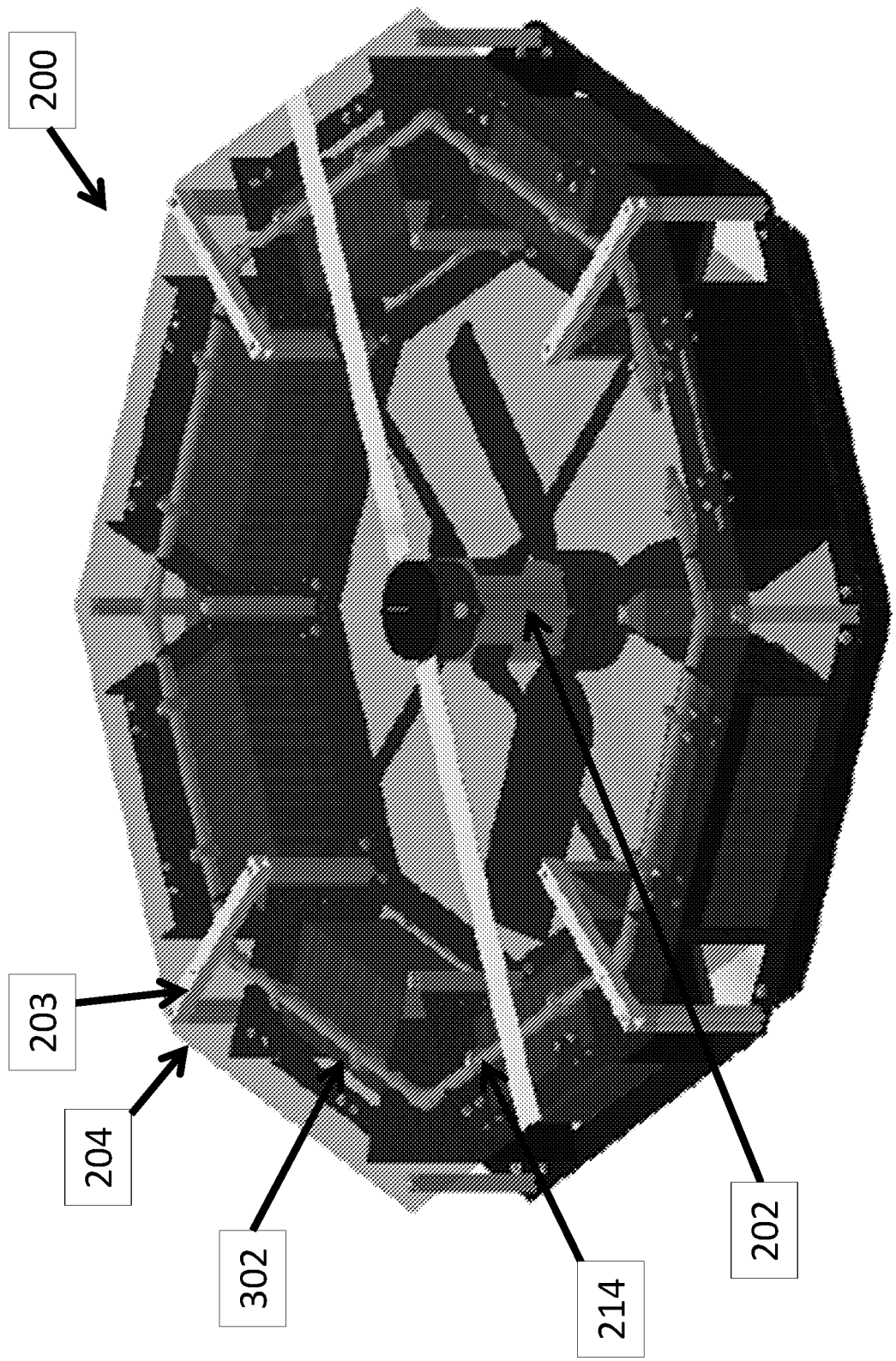

Cover 204 may be a cover that prevents air from being drawn in by the fan from across the surface upon which cover 204 is placed upon. In embodiments, cover 204 may be made from a metal material (e.g., aluminum, steel, copper, bronze, etc.), a plastic material, or a hybrid material. In embodiments, cover 204 may be non-transparent (as shown in FIG. 2) or may be transparent (as shown in FIG. 3). In embodiments, cover 204 may be octagonal, circular, rectangular, square, hexagonal, and/or any other shape. In embodiments, as shown in FIG. 2, an octagonal shape may allow for rectangular cuboid shaped pads 204 to be used. In alternate embodiments, a circular shaped cover 204 may allow for curved-shaped pads. In further alternate embodiments, cover 204 may include openings, passageways, slots of any shape, etc., that allow for air to enter from cover 204 and into circulation by fan 202 inside cooling device 200.

Trough 206 may be structure that may store liquid and may also provide for ducting of air exiting cooling device 200. In embodiments, trough 206 may be made from a metal material (e.g., aluminum, steel, galvanized steel, copper, bronze, etc.), a plastic material, or a hybrid material. In embodiments, trough 206 may be created by connecting multiple trough-shaped components (as further described in FIGS. 15 and 16). In alternate embodiments, trough 206 may be manufactured as one continuous structure. In embodiments, trough 206 may hold any liquid that may drip/move from pad 302 that has not evaporated. In embodiments, trough 206 may be used as a duct for incoming air to be forced through cooling device 200. In further embodiments, the shape of trough 206 (as further described in FIGS. 15 and 16) allows for the dimension "S," as shown in FIG. 2, of cooling device 200 to be reduced and, thus, reducing the amount of space taken up by cooling device 200. While cover 204 and trough 206 may be separate manufactured components that connect together (as described in further figures), in alternate embodiments, cover 204 and trough 206 may be a single manufactured component. Connector 208 may connect cover 204 to trough 206.

In embodiments, connector 208 may be a t-slotted bar (e.g., 80/20 long or short) that fits into apertures (e.g., holes, openings, etc.) within cover 204 and trough 206. In alternate embodiments, connector 208 may be a non-slotted bar.

FIG. 3 shows another example diagram of cooling device 200. In FIG. 3, cover 204 may be manufactured from a transparent material and allows for the internal components that make up cooling device 200 to be visible from a particular perspective view. As shown in FIG. 3, cooling device 200 includes fan 202, bracket 203, piping 214, cover 204, and pad 302 which is further described in FIG. 12. In embodiments, piping 214 is also described in further figures. In embodiments, bracket 203 may be used to connect cover 204 to trough 206 by using connectors, such as connector 306 (shown in FIG. 11).

Figure 4:
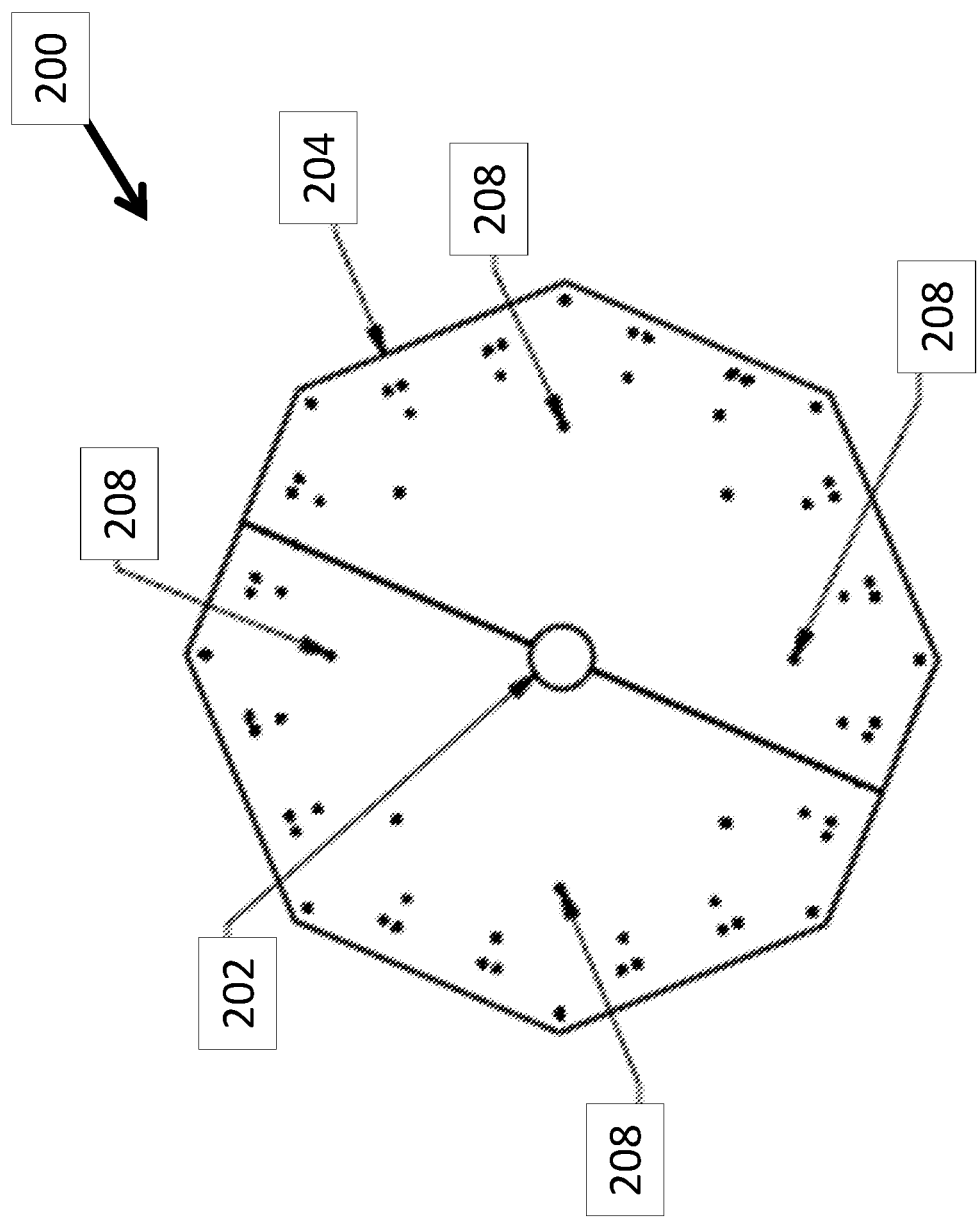
FIG. 4 is a view of an example cooling device.

FIG. 4 shows a view of cooling device 200 when being viewed from the side of cooling device 200 where cover 204 is located. From this view, the central hub of fan 202 is visible. In embodiments and from this view, connector 208 is also visible.

Figure 5:
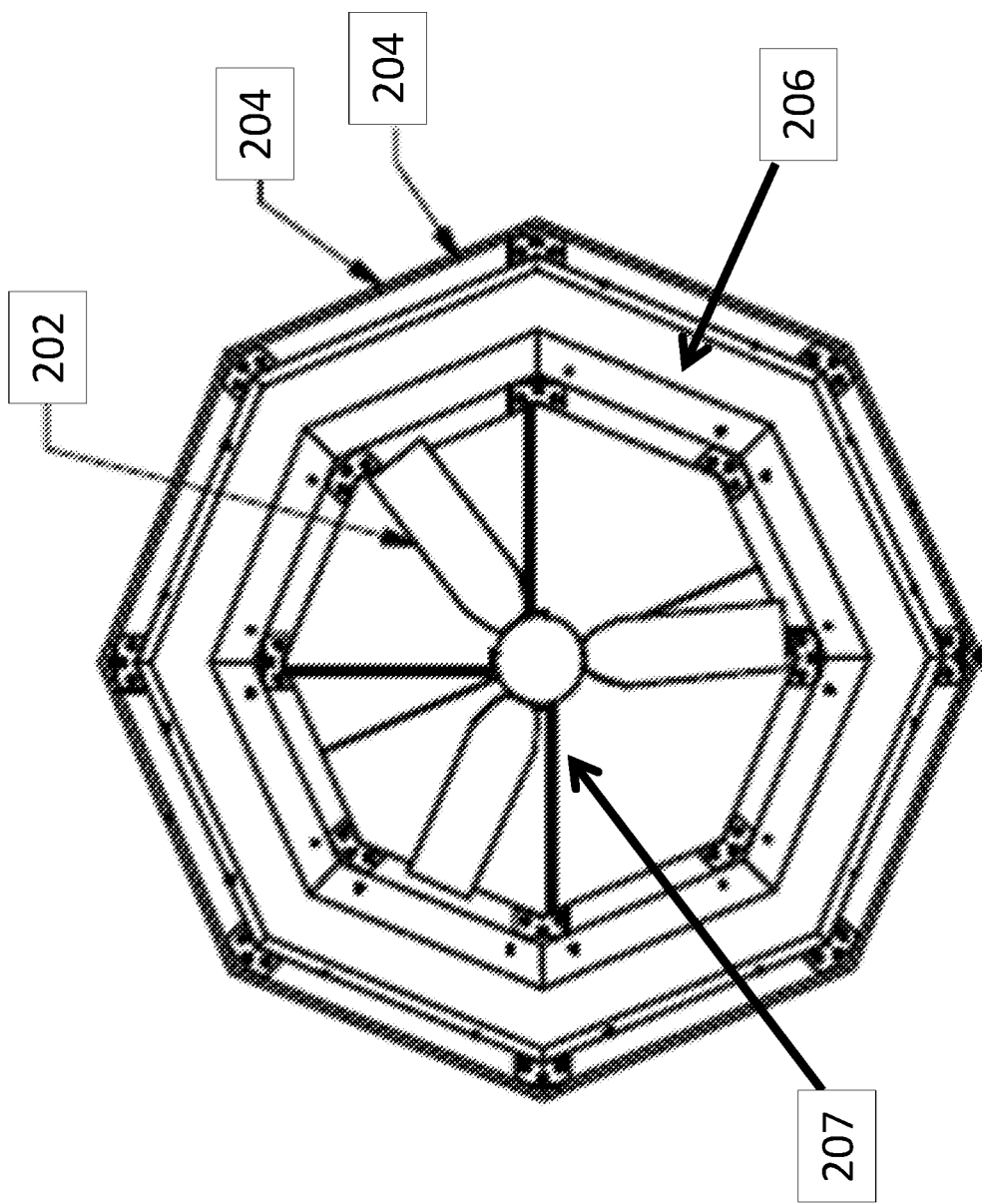
FIG. 5 is a view of an example cooling device.

FIG. 5 shows another view of cooling device 200 when being viewed from the area to which fan 202 will be forcing conditioned air. From this view, the blades of fan 202 are visible and a portion of cover 204 is visible when viewing from the side that shows the blades of the fan 202 that can circulate in a space created by trough 206 within cooling device 200. FIG. 5 also shows connecting rods 207. In embodiments, connecting rods 207 connect fan 202 to trough 206 to provide stability to fan 202 during rotation. In alternate embodiments, cooling device 200 may not have any connecting rods 207.

Figure 6:
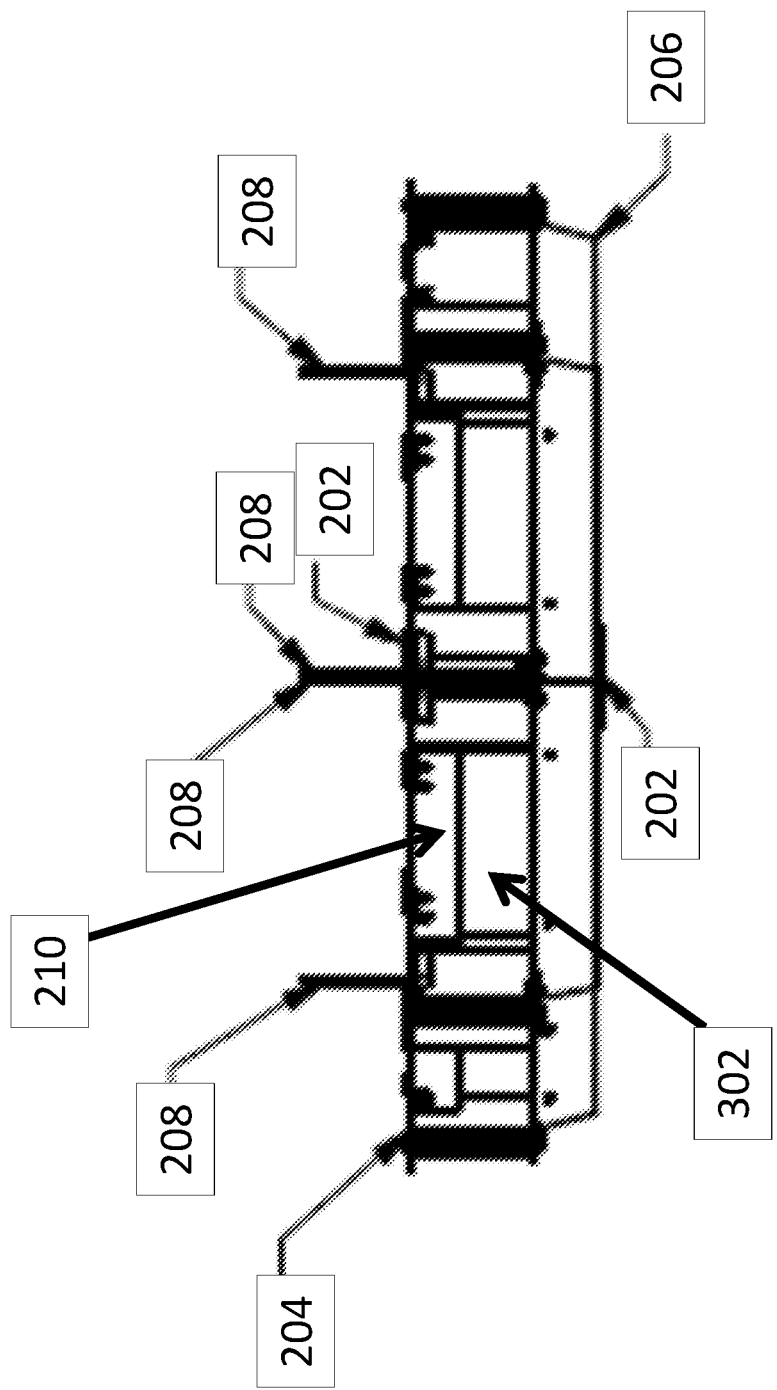
FIG. 6 is a view of an example cooling device.

FIG. 6 shows another view of cooling device 200 when being viewed from the sides of cooling device 200 from where air will enter cooling device 200. In embodiments, FIG. 6 shows fan 202, cover 204, trough 206, connector 208, pad cover 210, and pad 302. In embodiments, there may one or more pad covers 210 as there may be one or more pads 302. In embodiments, pad cover 210 may be a sheet of material, connected to cover 204 (e.g., welded, via a hinge, bolted on, etc.), that may be used to keep pad 302 within trough 206. In alternate embodiments, pad cover 210 may be used to conceal part or all of pad 302 from external view. Thus, for example, if cooling device 200 is attached from a ceiling and cover 204 is closest to the ceiling, pad cover 210 may conceal a portion of pad 302 that is furthest from the ground. In alternate embodiments, pad cover 210 may be attached to trough 206 instead of being connected to cover 204. Thus, for example, if cooling device 200 is attached from a ceiling and cover 204 is closest to the ceiling, pad cover 210 may conceal the portion of pad 302 that is closest to the ground. In embodiments, pad cover 210 may be cover about 20 to 100% of the surface of a particular pad 302.

In embodiments, the blades of fan 202 may extend below trough 206. For example, if cooling device 200 is mounted from a ceiling, the blades of fan 202 will be closer to the floor than the lower portion of trough 206. In alternate embodiments, the blades of fan 202 may be at the same level as the lower portion of trough 206. For example, if cooling device 200 is mounted from a ceiling, the lower portion of trough 206 will be at the same level as the blades of fan 202. In further embodiments, the blades of fan 202 may be less than the level of the lower portion of trough 206. For example, if cooling device 200 is mounted from a ceiling, the lower portion of trough 206 will be closer to the floor than the blades of fan 202.

Figure 7:
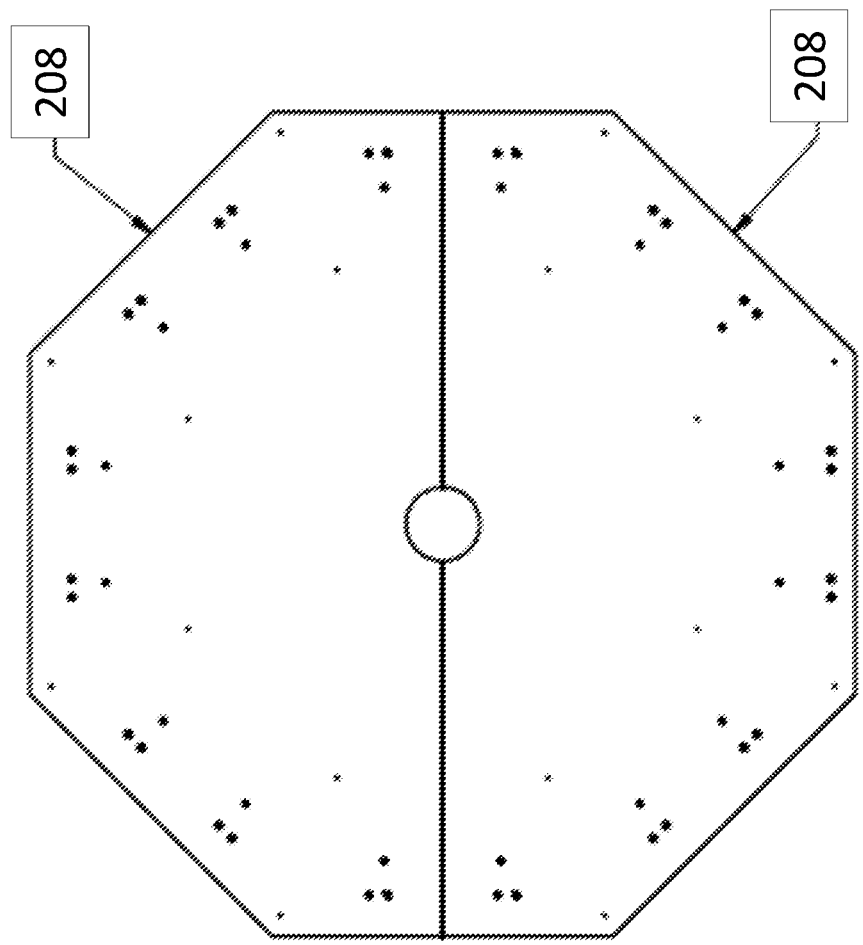
FIG. 7 is a view of an example cover.
Figure 8:
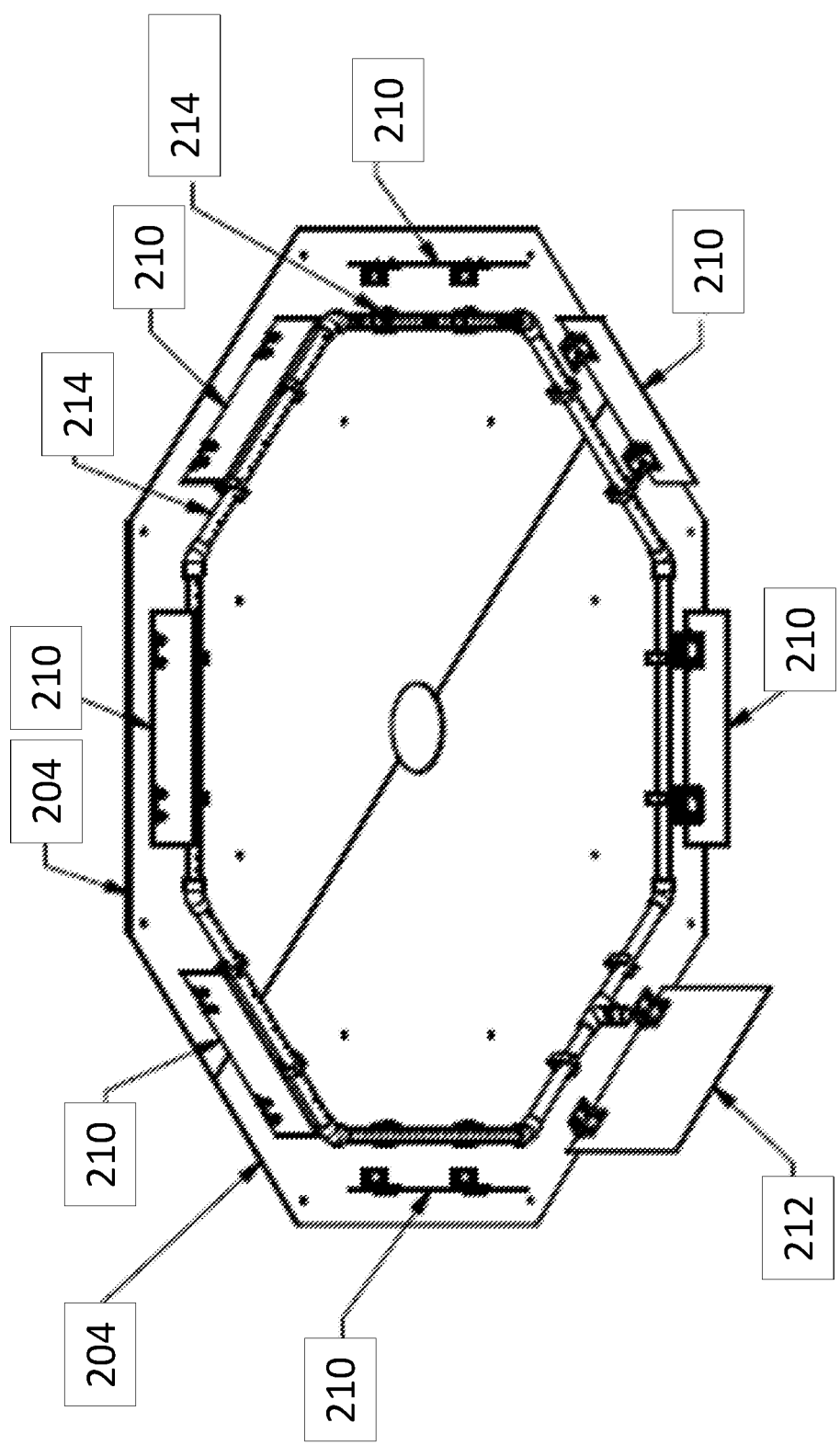
FIG. 8 is another view of an example cover.

FIG. 7 shows a view of cover 204 when being viewed from a particular view (e.g., a top view as if viewing from a room ceiling). FIG. 8 shows another view of cover 204 when being viewed from another particular view (e.g., as if looking up towards a ceiling). In embodiments, FIG. 8 shows pad covers 210, pump cover 212, and piping 214. In embodiments, piping 214 provide liquid (e.g., water) to each pad 302 that is within cooling device 200. In embodiments, piping 214 may be traverse along one or more of the sides of cover 204 and may be attached to cover 204 via one or more connection devices. In embodiments, piping 214 may have a portion that is connected to a liquid supply device (e.g., a pump) that may be a part of cooling device 200 or may be a separate device from cooling device 200. In embodiments, piping 214 may release liquid as a spray, jet, or sprinkle, from one or more openings, across the surface of piping 214, over one or more surfaces of pad 302. In embodiments, liquid openings on the surface of piping 214 may have nozzles or another device that can adjust the amount of liquid being transferred to each pad 302. In embodiments, piping 214 may be tubes that are connected with each other (e.g., using elbow connectors). In alternate embodiments, piping 214 may be manufactured as a single device without the need for connectors. In alternate embodiments, piping 214 may be attached to sections of trough 206 that are closest to cover 204. In further alternate embodiments, pad cover 210 and pump cover 212 may be attached to trough 206 instead of being connected to cover 204. In embodiments, piping 214 may be connected to a pump system. In embodiments, the pump system may be controlled by a computing device, as described in FIG. 25. In embodiments, the pump system may be a dry pump system. In embodiments, some of the liquid that is supplied to pads 302 may be transfer to trough 206. In embodiments, trough 206 may include a float valve, or other device, that detects the amount of liquid in trough 206. In embodiments, if the amount of liquid in trough 206 exceeds a certain threshold (e.g., by weight, by water level, by cubic feet, etc.), the pump may operate and provide liquid supply, via piping 214, to pads 302. In embodiments, the threshold may be determined by a measuring instrument attached to trough 206 and controlled by a computing device as described in FIG. 25. In embodiments, some of the liquid in trough 206 may be pumped out of trough 206 and redistributed back to pads 302. In embodiments, when the amount of liquid does not exceed a threshold, the pump may not operate and, accordingly, may not provide liquid to pads 302 via piping 214.

Figure 9:
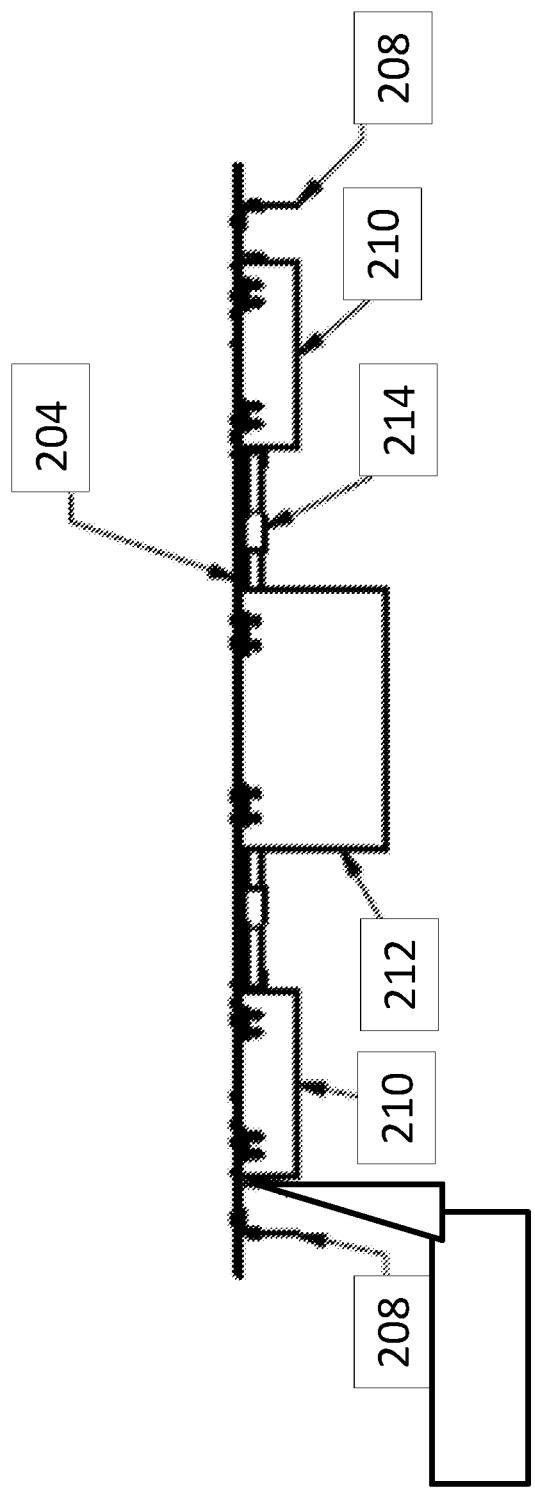
FIG. 9 is another view of an example cover.
Figure 10:
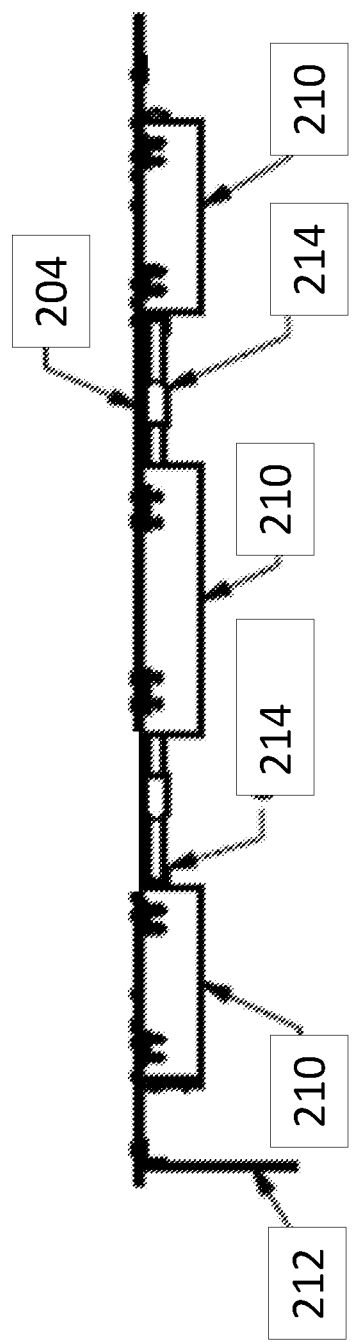
FIG. 10 is another view of an example cover.

FIG. 9 shows another view of cover 204 (e.g., a side view). In embodiments, FIG. 9 shows cover 204 with connector 208, pad covers 210, pump cover 212, and piping 214. FIG. 10 also shows another view of cover 204. In embodiments, FIG. 10 shows cover 204 with connector 208, pad covers 210, pump cover 212, and piping 214. As shown in FIGS. 9 and 10, pad covers 210 have a smaller height than pump cover 212. In alternate embodiments, pad cover 210 may be the same height as pump cover 212 or may be of greater height than pump cover 212.

Figure 11:
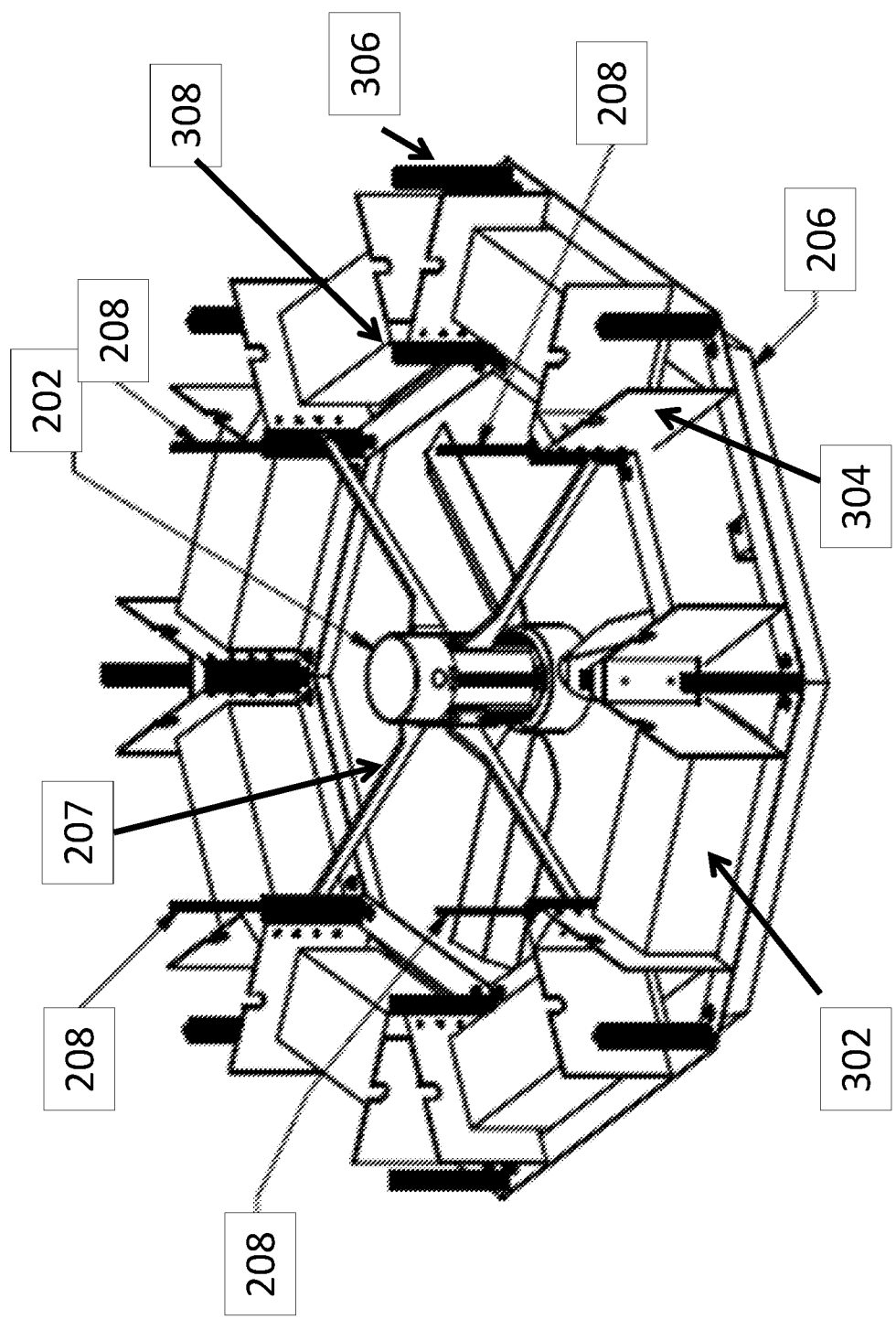
FIG. 11 is a view of an example trough.
Figure 12:
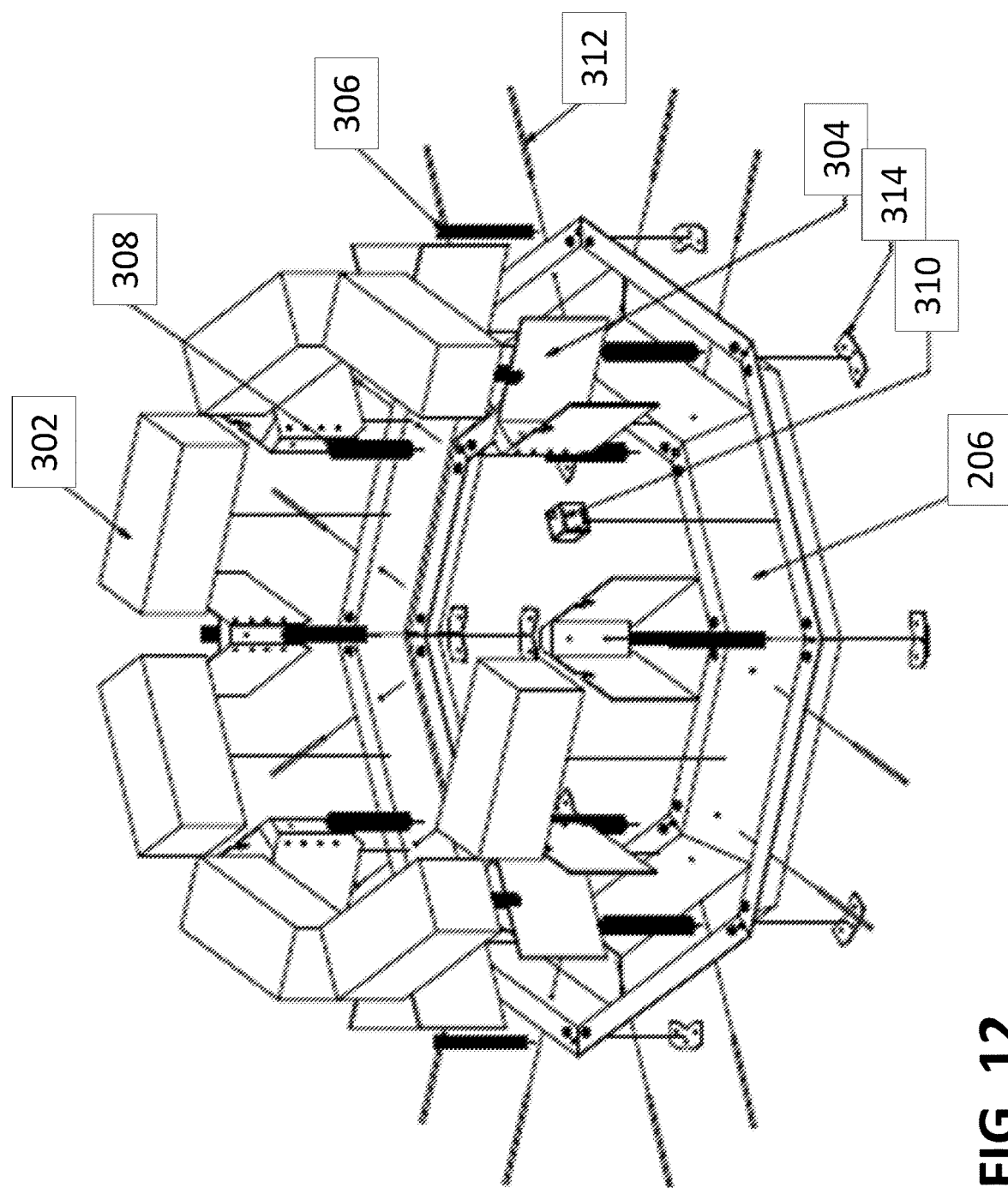
FIG. 12 is another view of an example trough.

FIG. 11 shows a perspective view of cooling device 200 without cover 204. In embodiments, FIG. 11 shows fan 202, trough 206, connector 208, pad 302, corner 304, connector 306, connector 308, and pump connector 310. FIG. 12 shows the same perspective view of cooling device 200 as FIG. 11; however, FIG. 12 further shows connector 312, and washer plate 314.

In embodiments, pad 302 may be made from a cellulose material, fiberglass, or grass material, that allows for receiving liquid (e.g., water). In embodiments, pad 302 may be made from a rigid material or a flexible material. In embodiments, pad 302 may sit in trough 206 without any connecting device being inserted into pad 302. In embodiments, pad 302 may be a shape with all linear sides, with some linear sides and some curved sides, and/or with all curved sides. In embodiments, fan 202 forces air through each pad 302. As such, evaporation of the liquid in each pad 302 occurs based on the forced air from fan 202. Accordingly, the evaporation of the liquid results in air that has passed over and through the pads to be cooler than when they entered cooling device 200. In embodiments, liquid, such as water, may evaporate from each pad 302 at a particular range. As such, the evaporation of liquid from each pad 302 prevents any issues with mist. Furthermore, the change in temperature of air moved over pad 302 is less than when the air temperature prior to moving over pad 302 based on the evaporation of liquid from pad 302. Thus, for example, if air enters pad 302 at 85 degrees Fahrenheit, the air may exit pad 302 at 77 to 78 degrees Fahrenheit.

In embodiments, corner 304 may be used to create an area within trough 206 to place a pad 302. In embodiments, corner 304 may be attached to trough 206 with connectors, as further described in other figures.

In embodiments, connector 306 may be used to connect trough 206 with cover 204. In embodiments, connector 308 may also be used to connect trough 206 with cover 204. In embodiments, connectors 306 and 308 may both be types of a t-slotted bar (80/20).

In embodiments, pump connector 310 may be used to connect water piping with a pump. While not shown in the figures, a pump may be a part of cooling device 200 and may be located totally or partially within trough 206. Alternatively, the pump may be a separate device that is not located within cooling device 200 and may operate based on receiving measurement information from one or more measuring devices located within trough 206.

In embodiments, connector 312 may be used to maintain pad 302's position within trough 206. In embodiments, connector 312 may be made of metal, plastic, or a hybrid material.

In embodiments, washer plates 314 may be used to connect corner 304 to trough 206 and also may be used to connect connectors 306 and 308 to trough 206.

Figure 13:
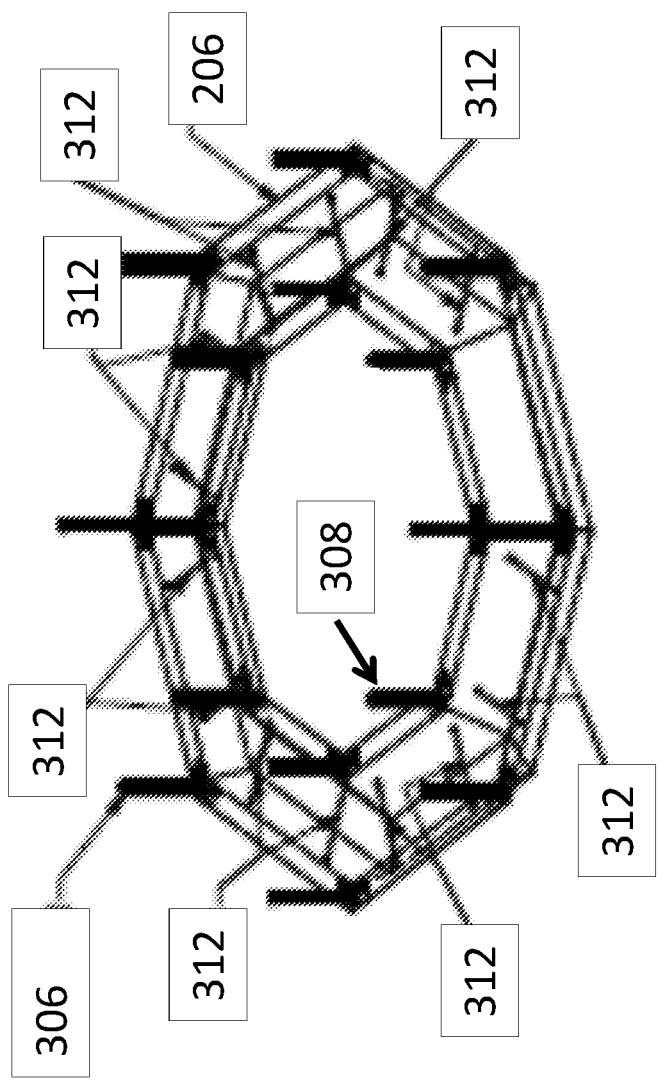
FIG. 13 is another view of an example trough.
Figure 14:
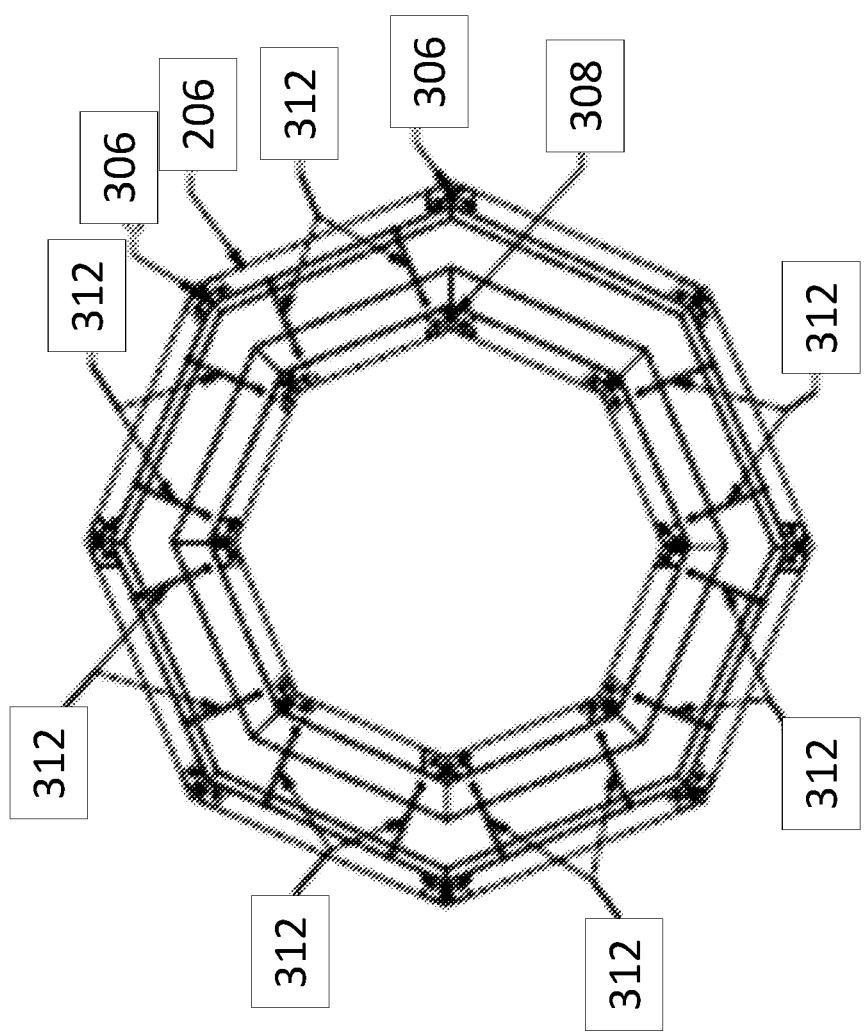
FIG. 14 is another view of an example trough.

FIG. 13 shows a perspective view of how connectors 306, connectors 308, and connectors 312 are located around trough 206. FIG. 14 shows another view of how connectors 306 and connectors 312 are located around trough 206 and their relationship to each other. In embodiments, the distance between connectors 312 provide a length sufficient to fit pad 302 so that 302 will not fall out of trough 206. For example, if the length of pad 302 is 14 inches, the connectors 312 may be located about 14 to 14.1 inches. In embodiments, connectors 306 and 308 are located throughout trough 206.

Figure 15:
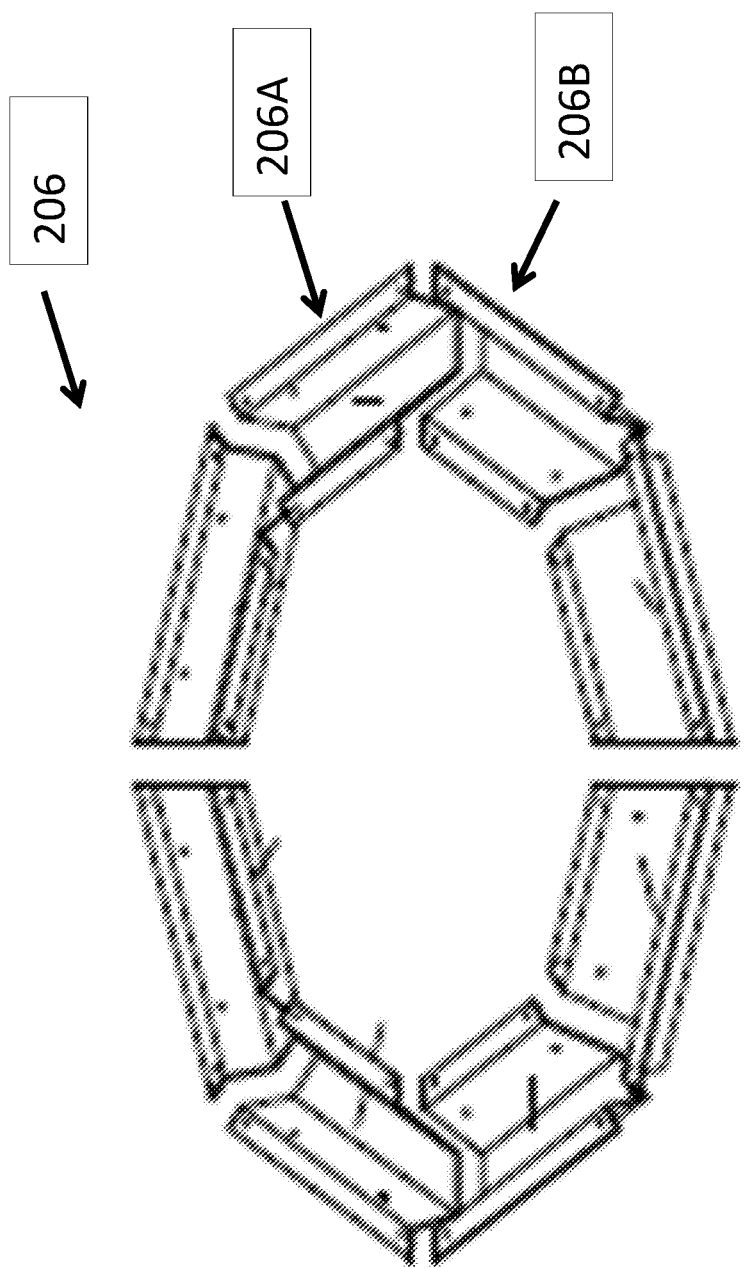
FIG. 15 is another view of an example trough.

FIG. 15 shows another example of trough 206. As shown in FIG. 15, this example of trough 206 shows trough 206 as being made up of multiple parts, such as part 206A and 206B. In embodiments, each part, such as part 206A and 206B may be connected to each other (e.g., by welding, soldering, gluing, etc.) to create trough 206. In embodiments, trough 206 may include illuminating devices (e.g., lights, reflectors, etc.) that may be located on the portion of trough 206 that is furthest from cover 204. Thus, if cooling device 200 is used when there is little or no sunlight present, cooling device 200 can also provide illumination in an area, such as an outside patio area.

Figure 16:
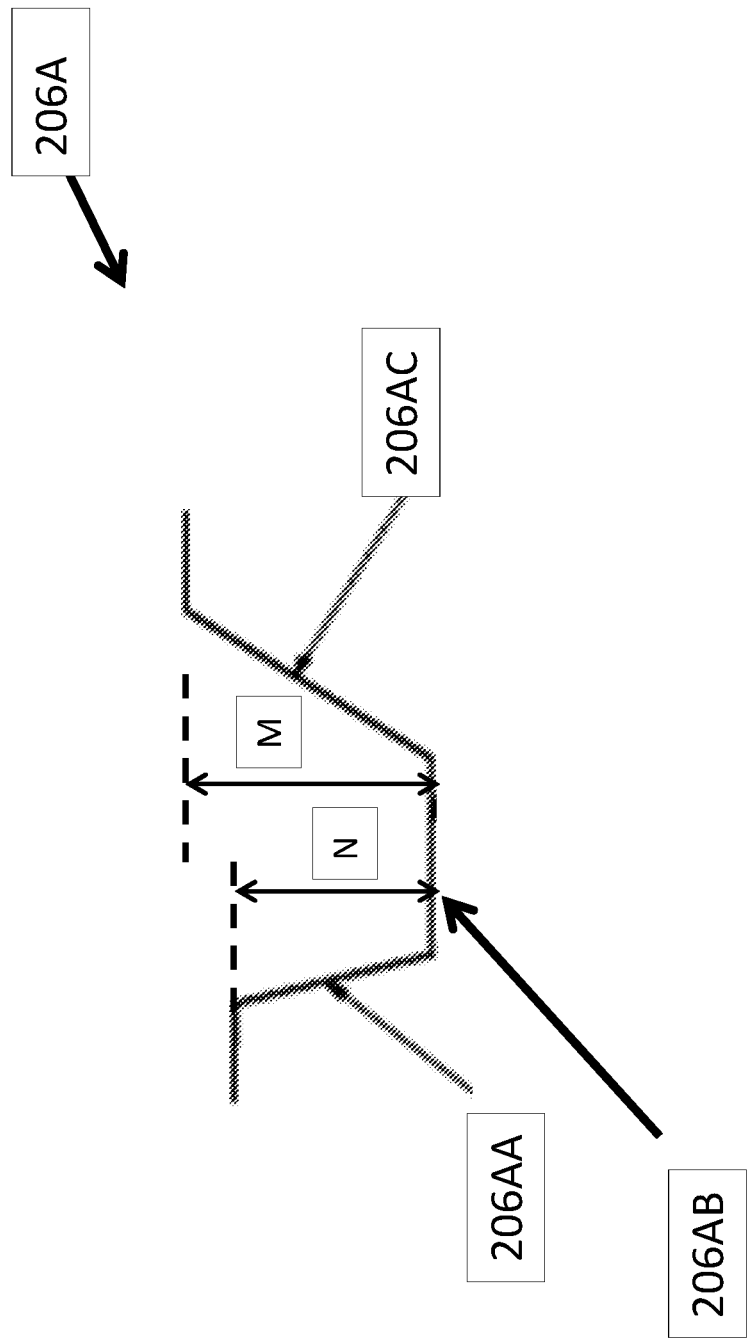
FIG. 16 is a view of a portion of an example trough.

FIG. 16 shows a view of a part of trough 206, such as part 206A. In embodiments, part 206A has portions 206AA, 206AB, and 206AC. In embodiments, portion 206AA and 206AC connect to portion 206AB, each at an angle, such that the length "N" is less than length "M." In embodiments, "N" may range from about 3 to 4 inches and "M" may range from 4.5 to 5.5 inches. However, in alternate embodiments, different dimension values may exist outside of these ranges. In embodiments, each part of trough 206, such as part 206A, may hold a pad 302. In embodiments, portion 206AA may be viewed as the exterior of part 206A from outside cooling device 200 and, as such, the exterior of trough 206.

Figure 17:
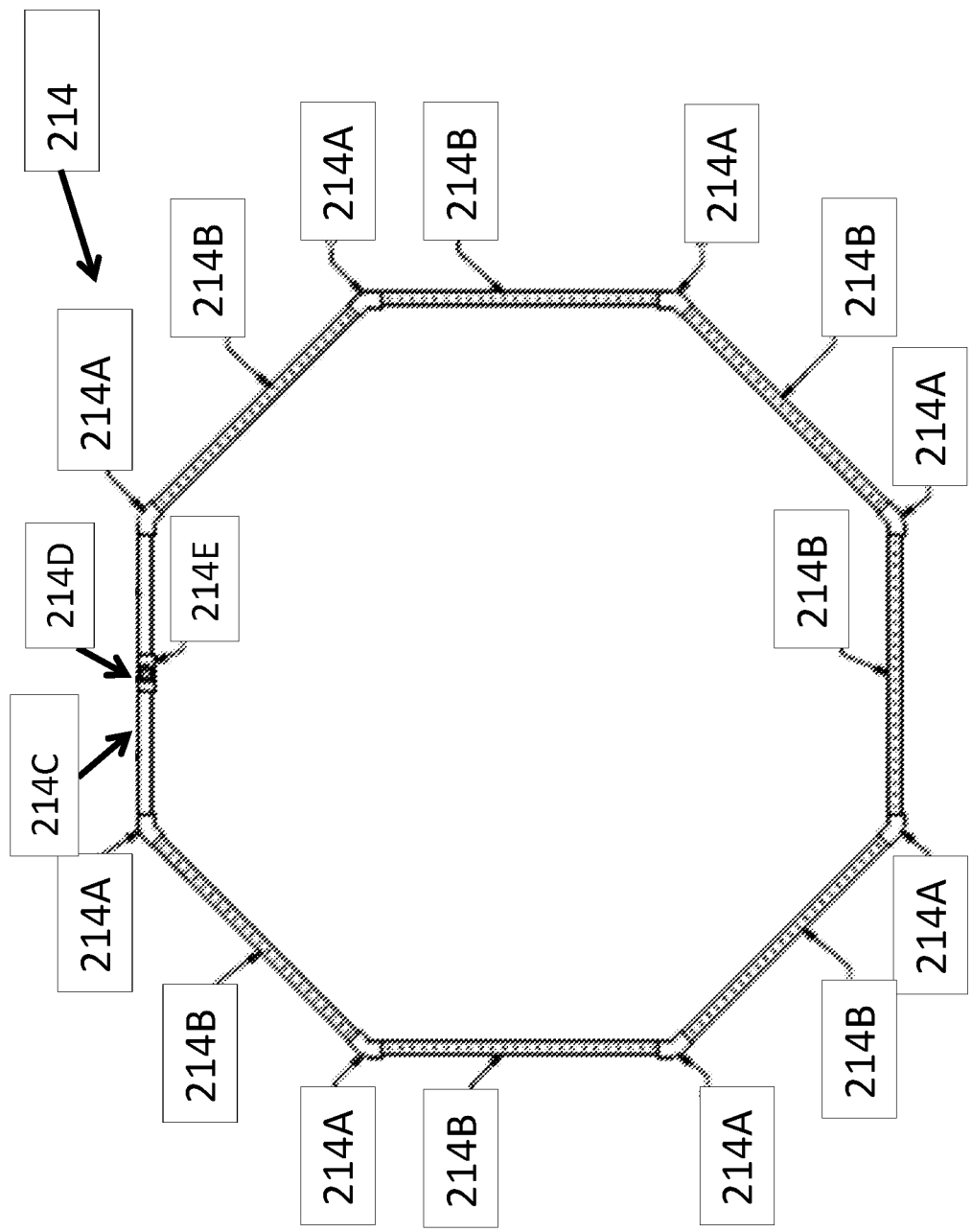
FIGS. 17 and 18 are diagrams of example piping.

FIG. 17 shows an example view of piping 214. As shown in FIG. 17, piping 214 includes elbow 214A, pipes 214B, supply pipe 214C, adaptor 214D, and fitting 214E. In embodiments, pipes 214B are connected to each other with elbows 214A. In embodiments, supply pipe 214C is connected to pipes 214B via elbows 214A.

Figure 18:
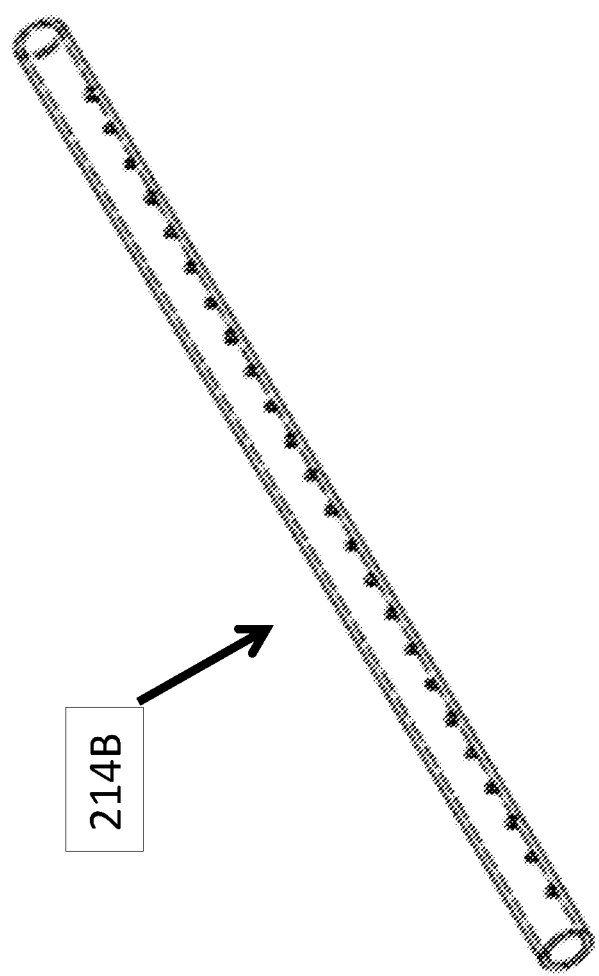

FIG. 18 shows an example pipe 214B. In embodiments, pipe 214B may be made of polyvinyl chloride (PVC), rubber, another type of plastic material, a metal material, or a hybrid material. In embodiments, pipe 214B may have entry-ways (e.g., holes) that allow a liquid (e.g., water) to be exerted over each pad 302 located within cooling device 200. In embodiments, the liquid may be pressurized from an external source that pumps water into pipe 214B. In embodiments, each entry-way may be equally spaced or may not be equally spaced.

Figure 19:
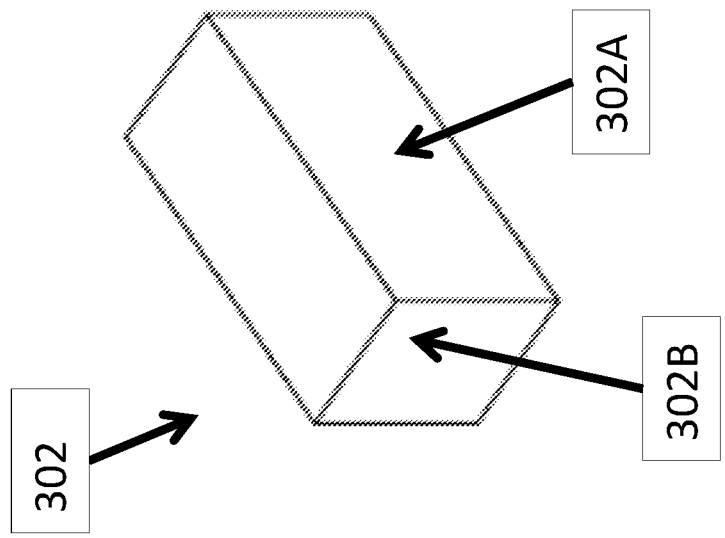
FIG. 19 is a diagram of an example pad.
Figure 19:
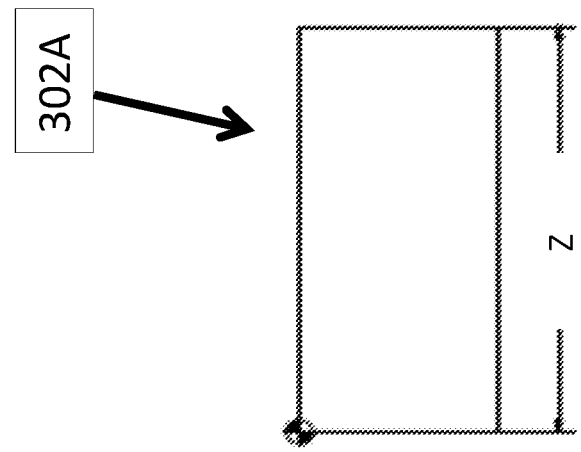
Figure 19:
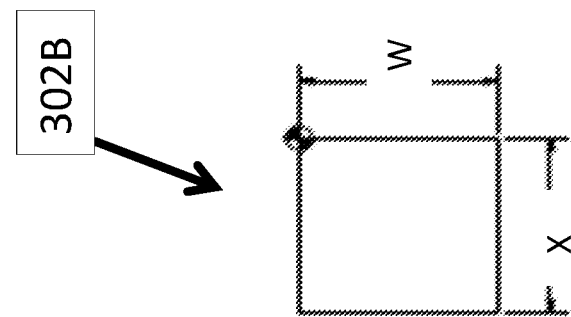

FIG. 19 shows different views of pad 302. As shown in FIG. 19, pad 302 may have sides 302A and 302B. In embodiments, side 302A has a dimension measurement "Z." In embodiments, "Z" may range from about 10 inches to 16 inches. In embodiments, side 302B has dimension measurements of "X" and "W." In embodiments, "X" and "W" may range from about 4 inches to 8 inches. In alternate embodiments, the dimensions may be different and outside the above noted ranges.

Figure 20:
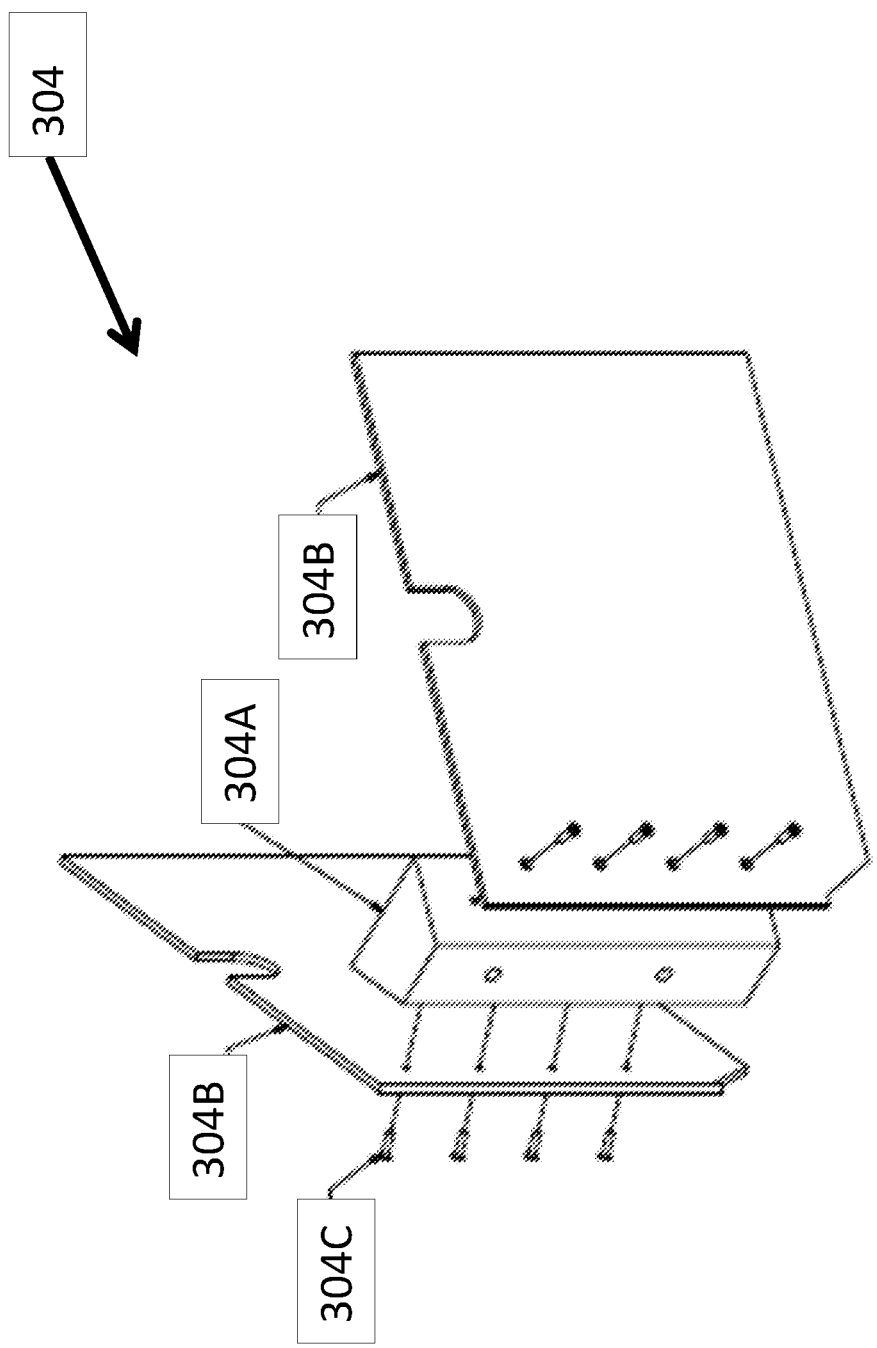
FIGS. 20 and 21 are diagrams of an example corner.

FIG. 20 shows an exploded view of corner 304. In embodiments, FIG. 20 shows center 304A, plates 304B, and connectors 304C. In embodiments, center 304A may have a shape of a trapezoidal prism. In embodiments, corner 304 may be made of wood, metal, plastic, or of a hybrid material. In embodiments, plates 304B may be attached to sides of center 304A by using connectors 304C through apertures within plates 304B and center 304A. In embodiments, connectors 304C may be pins, screws, bolts, welding, and/or any other type of device for connecting two components.

Figure 21:
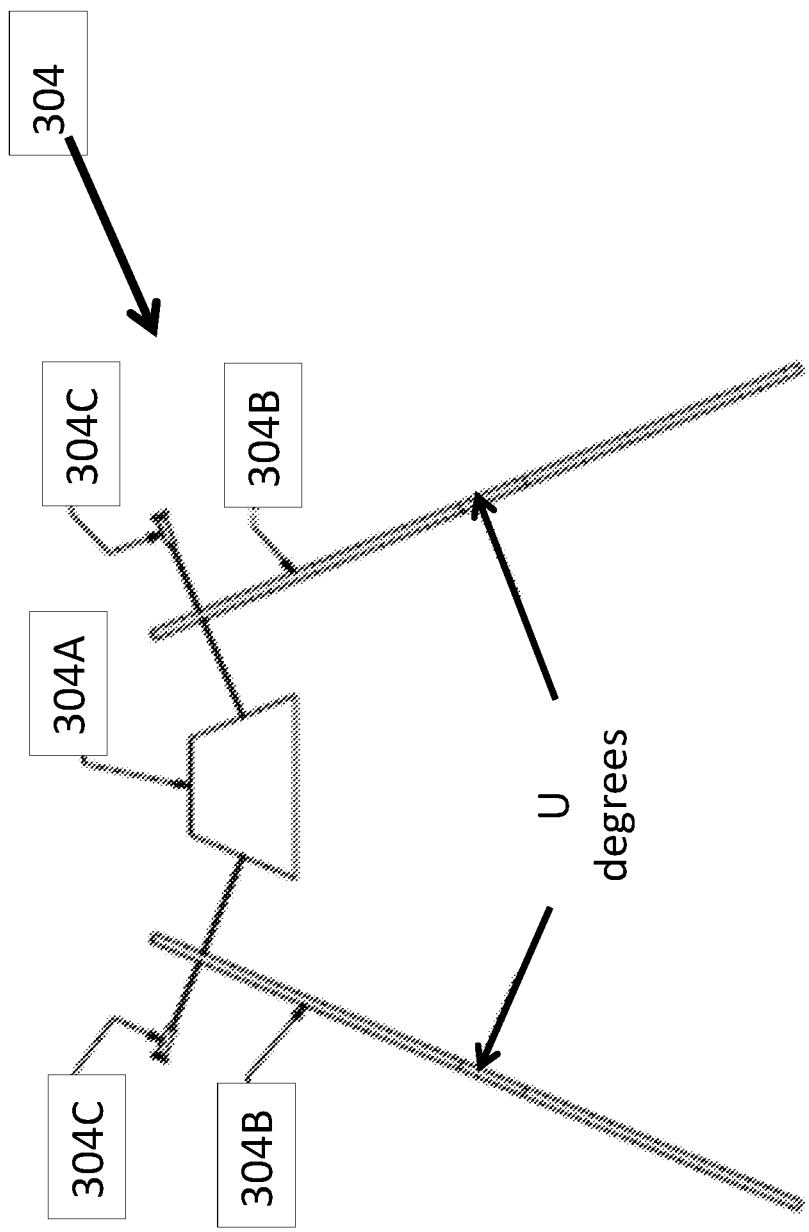

FIG. 21 shows another exploded view of corner 304. FIG. 21 shows center 304A, plates 304B, and connectors 304C.

Figure 22:
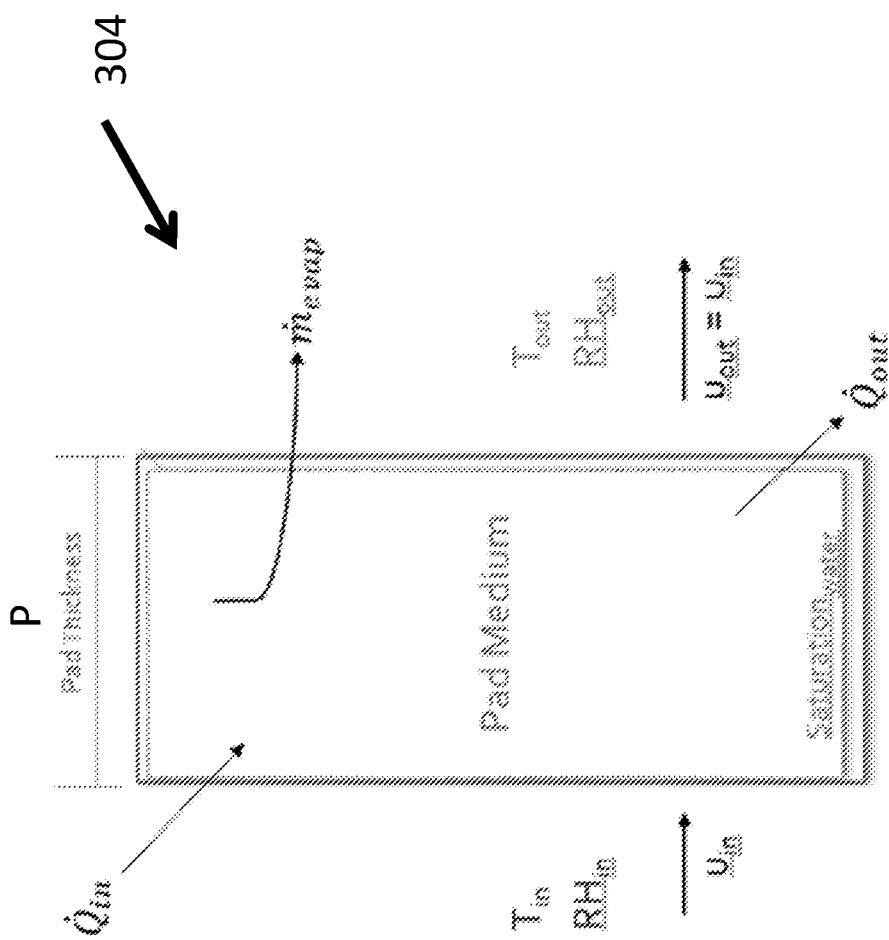
FIG. 22 is a schematic diagram of various conditions associated with a pad.

FIG. 22 shows a schematic drawing of a pad, such as pad 302. As shown in FIG. 22, the pad has a pad thickness (P), a pad medium, an incoming air velocity ($u_{in}$), an outgoing air velocity ($u_{out}$), incoming air temperature ($T_{in}$), incoming air relative humidity ($RH_{in}$), outgoing air relative humidity ($RH_{out}$), incoming liquid flowrate ($Q_{in}$), outgoing liquid flowrate ($Q_{out}$), evaporation rate ($m_{evap}$), and saturation of water ($saturation_{water}$).

In embodiments, the pad may be used in cooling device 200 and the particular components of cooling device 200 as described in FIGS. 1B and 2-21. In embodiments, the pad may utilize a cellulose material. In embodiments, the pad medium and the pad thickness (P) may have particular dimensions that allow for the pad to provide for (1) a temperature decrease in air, such that $T_{out}$ is less than $T_{in}$, (2) an increase in relative humidity, such that $H_{out}$ is greater than $RH_{in}$, (3) a particular level of water saturation in the pad so that the pad does not dry out and also does not cause liquid mist to exit the pad, (4) an evaporation rate ($m_{evap}$) that ensures that $T_{out}$ is less than $T_{in}$ while maintaining a level of water saturation that prevents the pad from drying out, (5) an incoming liquid flowrate ($Q_{in}$) that ensures that the pad is saturated with a level of liquid, such as water, while providing for a particular evaporation rate ($m_{evap}$) and an outgoing liquid flowrate ($Q_{out}$) which ensures that $T_{out}$ is less than $T_{in}$ without resulting in (i) the pad from drying out, and/or (ii) mist from exiting the pad, and/or (6) a relationship between the change in temperature, from $T_{out}$ and $T_{in}$, and the amount of liquid saturation (e.g., $saturation_{water}$).

In embodiments, the thickness (P) of the pad may determine the size of cover 204 and trough 206, as described in previous drawings. In embodiments, the thickness (P) of the pad may determine the quantity liquid provided by piping, such as piping 214 as described in previous drawings. In embodiments, the amount of liquid that flows from piping 214 may determine the incoming liquid flowrate ($Q_{in}$). In embodiments, the outgoing air velocity ($u_{out}$) may be the same or similar to the incoming air flow ($u_{in}$). In embodiments, the outgoing air velocity ($u_{out}$) may be air, once passed across the pad, which circulates within trough 206 and then being pushed down by fan 202 as described in the previous figures. In embodiments, the incoming air velocity ($u_{in}$) may determine that evaporation of liquid occurs without "over carry." "Over carry" occurs when a liquid leaves the pad, and is pushed by fan 202, before there is evaporation of the liquid and which results in mist. In embodiments, liquid that does not evaporate will be outgoing liquid flowrate ($Q_{out}$) which will flow into trough 206.

Figure 23:
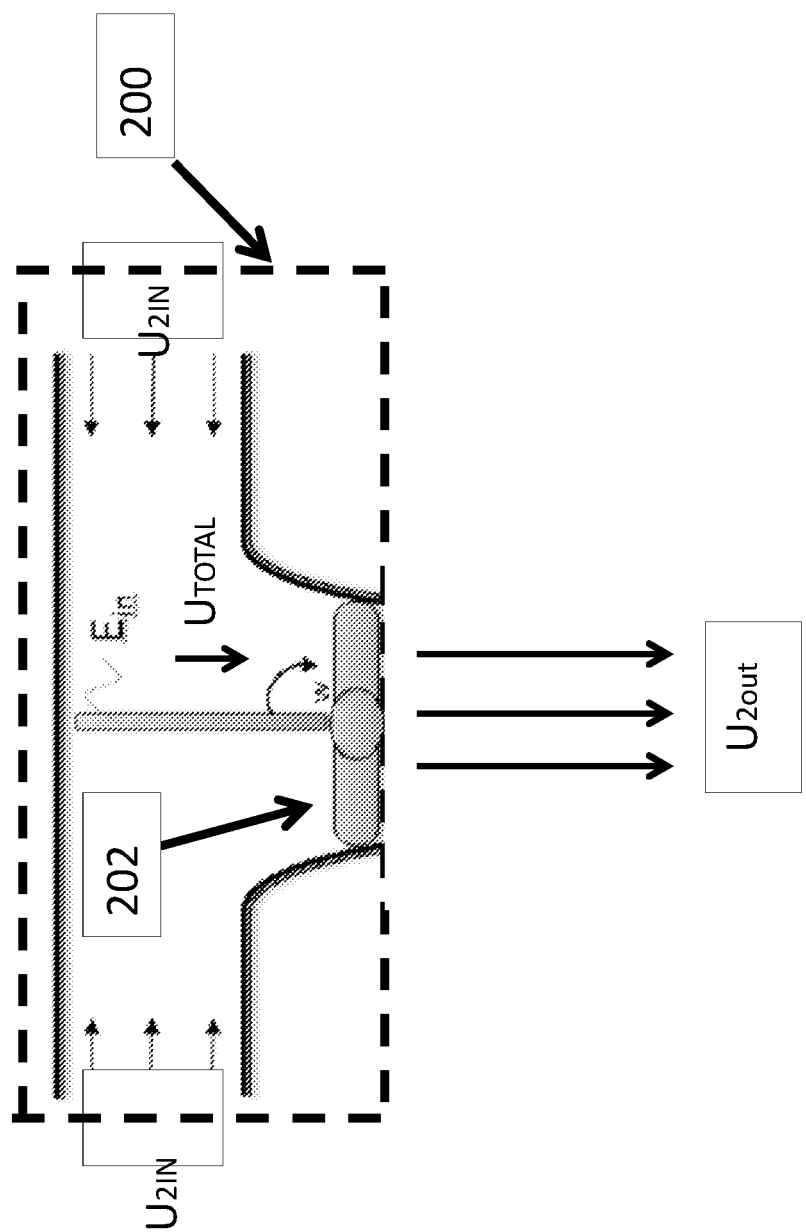
FIG. 23 is a schematic diagram of a cooling device.

FIG. 23 is a schematic drawing of cooling device 200 and fan 202. In embodiments, FIG. 23 describes the incoming airflow velocity ($u_{2in}$), which is the air velocity that is exiting from a pad, such as the pad described in FIG. 22, and outgoing airflow ($u_{2out}$) which is airflow velocity that is blown by fan 202 into an area. In embodiments, fan 202 may rotate at a given rotations per minute (RPM), input fan power ($E_{in}$), and at a given fan pitch to provide the desired outgoing airflow from fan 202. In embodiments, the shape of cover 204 and trough 206, described in earlier figures, may affect the incoming airflow velocity into fan 202 and the outgoing airflow velocity exiting from fan 202.

In embodiments, each incoming airflow associated with each incoming airflow velocity combines together ($U_{TOTAL}$) near or above fan 202, within the space created by combining cover 204 and trough 206, before then exiting fan 202 as an outgoing airflow ($u_{2out}$) associated with outgoing airflow velocity. In embodiments, the fan motor may be controlled by a computing device, as described in FIG. 25.

While the previous figures show pads 302, alternate embodiments of cooling device 200 may not include any pads. Instead, cooling device 200 may use an atomization process to distribute liquid within and around fan 202 within FIG. 2. In embodiments, atomization may be considered as a process of converting a liquid into very fine particles or droplets. Accordingly, in alternate embodiments, cooling device 200 may not include corners 304. Instead, cooling device 200 may have piping 214 to include particularly sized nozzles that receive liquid (e.g. via a pump or other device) that, when exerted through openings in piping 214, result in the liquid being atomized. In embodiments, this results in atomized liquid being sprayed across fan 202. As a result, trough 206 may not hold any water as the liquid is atomized and transferred away from cooling device 200 by fan 202.

Also while the previous figures and embodiments show fan 202 operating at the same time as a pump is providing liquid to pads 302, embodiments may have fan 202 operating only and no pump providing liquid to pads 302. In embodiments, an electronic switch (e.g., on cooling device 200, on a remote wireless controller to cooling device 200, etc.) may switch the operation of cooling device 200 so that it is only uses fan 202 and the pump is not operating to provide liquid to pads 302. In alternate embodiments, another electronic switch may open and close cover 204. Thus, for example, if only fan 202 is operating, and not the pump, cover 204 may be opened for additional air supply.

FIGS. 24A and 24B are diagrams of an alternate embodiment of cooling device 200, cooling device 2400. As shown in FIGS. 24A and 24B, cooling device 2400 may a ceiling rod 2402, shield 2404, pad 2406, float valve 2408, and diffuser 2410. In embodiments, ceiling rod 2402 may allow for cooling device 2400 to be connected to a ceiling directly or indirectly. In embodiments, shield 2404 may cover pad 2406 in a manner similar to pad cover 210 as described in previous figures.

In embodiments, pad 2406 may provide liquid to airflow in a manner similar to pad 302 as described in previous figures. In embodiments, float valve 2408 may be located in a trough-like structure, such as trough 206, as described in previous figures. In embodiments, diffuser 2410 may connect to the bottom of cooling device 2400 and provide a particular type of airflow distribution from cooling device 2400 to the area surrounding cooling device 2400.

FIG. 25 is a diagram of example components of a cooling device 200. Device 2500 may correspond to computing devices that are part of cooling device 200 and/or a control system associated with cooling device 200. Alternatively, or additionally, fan 202 and/or the pump may include one or more devices 2500 and/or one or more components of device 2500.

As shown in FIG. 25, device 2500 may include a bus 2510, a processor 2520, a memory 2530, an input component 2540, an output component 2550, and a communications interface 2560. In other implementations, device 2500 may contain fewer components, additional components, different components, or differently arranged components than depicted in FIG. 25. Additionally, or alternatively, one or more components of device 2500 may perform one or more tasks described as being performed by one or more other components of device 2500.

Bus 2510 may include a path that permits communications among the components of device 2500. Processor 2520 may include one or more processors, microprocessors, or processing logic (e.g., a field programmable gate array (FPGA) or an application specific integrated circuit (ASIC)) that interprets and executes instructions. Memory 2530 may include any type of dynamic storage device that stores information and instructions, for execution by processor 2520, and/or any type of non-volatile storage device that stores information for use by processor 2520.

Input component 2540 may include a mechanism that permits a user to input information to device 2500, such as a keyboard, a keypad, a button, a switch, etc. Output component 2550 may include a mechanism that outputs information to the user, such as a display, a speaker, one or more light emitting diodes (LEDs), etc.

Communications interface 2560 may include any transceiver-like mechanism that enables device 2500 to communicate with other devices and/or systems. For example, communications interface 2560 may include an Ethernet interface, an optical interface, a coaxial interface, a wireless interface, or the like.

In another implementation, communications interface 2560 may include, for example, a transmitter that may convert baseband signals from processor 2520 to radio frequency (RF) signals and/or a receiver that may convert RF signals to baseband signals. Alternatively, communications interface 2560 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 2560 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 2560 and transmit the RF signals over the air, and receive RF signals over the air and provide the RF signals to communications interface 2560. In one implementation, for example, communications interface 2560 may communicate with a network (e.g., wireless network, Internet, Intranet, etc.).

As will be described in detail below, device 2500 may perform certain operations. Device 2500 may perform these operations in response to processor 2520 executing software instructions (e.g., computer program(s)) contained in a computer-readable medium, such as memory 2530, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 2530 from another computer-readable medium or from another device. The software instructions contained in memory 2530 may cause processor 2520 to perform processes described herein. Alternatively, hardwired circuitry may be used in place of or in combination with software instructions to implement processes described herein. Thus, implementations described herein are not limited to any specific combination of hardware circuitry and software.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A cooling device, comprising:
    a cover;
    a trough connected to the cover;

a fan located between the cover and the trough;
  wherein, multiple fan connectors connect to the fan;
  multiple corners,
    wherein each of the multiple corners is:
      located within the trough, and
      trapezoidal in shape;
  multiple brackets,
    wherein,
      each of the multiple brackets is located between each corresponding one of the multiple corners, and none of the multiple brackets connect to each other; and
  piping sections connected to one another that traverse around the cover,
    wherein the piping sections are located below a top part of the multiple brackets;
  wherein:
    each of the multiple corners includes a first part, a second part, and a third part with the first part connected to the second part and the third part connected to the second part,
      wherein:
        the second part of each of the multiple corners is closer to the fan than:
          a front edge of the first part, and
          a front edge of the third part of each of the multiple corners,
            wherein the front edge of the first part and the front edge of the third part do not connect with the second part of each of the multiple corners, and
            the piping sections are placed within grooves located on a top edge of the first part and the third part of each of the multiple corners, and the cooling device further comprising:
        multiple pads, wherein the multiple pads are located entirely below the piping sections;
        multiple pad covers, connected to the cover, wherein a surface area of each of the multiple pad covers is 20% of the surface area of each corresponding one of the multiple pads, and
          each of the multiple pad covers is located between each corresponding one of the multiple corners.

2. The cooling device of claim 1, wherein the piping sections have apertures that are located equidistant to each other.

3. The cooling device of claim 1, further comprising:
  one or more pads,
    wherein each of the one or more pads is 3 inches in thickness.

4. The cooling device of claim 1, wherein a front edge of the trough has a smaller height than a rear edge of the trough, wherein:
    the front edge of the trough faces towards an outside of the cooling device, and
    each of the multiple brackets has two legs attached to the trough,
      wherein the two legs of each of the multiple brackets are perpendicular to the trough, and
        wherein one of the two legs of each of the multiple brackets is not connected to any of the multiple corners.

5. A cooling device, comprising:
  a fan;
  multiple connecting rods connected to the fan;
  multiple corners, wherein each of the multiple corners includes:
    a first part connected to a second part, and
    a third part connected to the second part,
      wherein pins connect the first part to the second part and other pins connect the third part to the second part;
  a trough, wherein:
    the trough is located below a portion of the fan, wherein blades of the fan are level with a bottom surface the trough,
    wherein each of the multiple connecting rods connects to the trough,
    a front edge of the trough has a smaller height than a rear edge of the trough,
    wherein,
      the front edge and the rear edge are both linear;
  multiple connectors, wherein each of the multiple connectors connects to the front edge of the trough, and wherein none of the multiple connectors connect to the first part, the second part, and the third part of any of the multiple corners;
  multiple brackets, wherein:
    each of the multiple brackets is located between the first part and the third part of the multiple corners, wherein the second part of each of the multiple corners connects to a first leg of each of the multiple brackets and each of the multiple connectors is a second leg of each of the multiple brackets; and
  piping, wherein:
    the piping includes piping sections,
      wherein each of the piping sections is placed within a groove within a top edge of the first part and a top edge of the third part of each of the multiple corners,
      wherein each of the piping sections is perpendicular to the first part and the third part, and
        wherein the piping sections are connected to each other at a location between the first part and the third part without any of the piping sections touching the second part.

6. The cooling device of claim 5, further comprising:
  multiple pads, wherein each of the multiple pads is:
    located within an area of the trough that is between adjacent two of the multiple corners, and
    located entirely below the piping sections;
  two other connectors connected to each of the multiple areas of the trough that are between each of the multiple corners,
    wherein,
      the two other connectors are perpendicular to each of the multiple areas of the trough,
      wherein, the two other connectors are not connected to:
        any of the multiple corners,
        any of the multiple brackets,
        any of the multiple connectors, and
          wherein each of the multiple pads is maintained in position by the two other connectors.

7. The cooling device of claim 6, wherein the first part and the third part of each of the multiple corners are at an acute angle to the two other connectors located within each of the multiple areas of the trough.

8. The cooling device of claim 7, wherein the first part and the third part are plates, wherein:
    a rear edge of each of the plates, closest to the fan, connects to the second part, and
    a front edge of each of the plates does not connect to anything.

9. The cooling device of claim 8, further comprising:
pad covers, wherein each of the pad covers is:
- in front of each of the multiple pads, and
- located between the first part and the third part without the pad cover touching the bottom of the trough.

10. The cooling device of claim 9, wherein each of the piping sections, located above each of the multiple pads, is parallel to the top surface of a corresponding one of the multiple pads.

11. The cooling device of claim 10, wherein none of the multiple pads are perpendicular to each other.

* * * * *